(12) United States Patent
Verma et al.

(10) Patent No.: US 10,404,745 B2
(45) Date of Patent: Sep. 3, 2019

(54) AUTOMATIC PHISHING EMAIL DETECTION BASED ON NATURAL LANGUAGE PROCESSING TECHNIQUES

(71) Applicants: Rakesh Verma, Sugar Land, TX (US); Narasimha Karpoor Shashidhar, The Woodlands, TX (US); Nabil Hossain, Houston, TX (US); Nirmala Rai, Jersey City, NJ (US)

(72) Inventors: Rakesh Verma, Sugar Land, TX (US); Narasimha Karpoor Shashidhar, The Woodlands, TX (US); Nabil Hossain, Houston, TX (US); Nirmala Rai, Jersey City, NJ (US)

( * ) Notice: Subject to any disclaimer, the term of this patent is extended or adjusted under 35 U.S.C. 154(b) by 0 days.

(21) Appl. No.: 15/225,587

(22) Filed: Aug. 1, 2016

(65) Prior Publication Data

US 2016/0344770 A1 Nov. 24, 2016

Related U.S. Application Data

(63) Continuation-in-part of application No. 14/015,524, filed on Aug. 30, 2013, now abandoned.

(51) Int. Cl.
*H04L 29/06* (2006.01)
*H04L 12/58* (2006.01)
*G06N 20/00* (2019.01)

(52) U.S. Cl.
CPC ......... *H04L 63/1483* (2013.01); *G06N 20/00* (2019.01); *H04L 51/22* (2013.01)

(58) Field of Classification Search
CPC .... H04L 63/1483; H04L 51/22; G06N 99/005
See application file for complete search history.

(56) References Cited

U.S. PATENT DOCUMENTS

| | | | | |
|---|---|---|---|---|
| 7,890,588 B2 * | 2/2011 | Takahashi | ............... | H04L 67/28 709/203 |
| 8,752,172 B1 * | 6/2014 | Dotan | ................. | H04L 63/1483 709/206 |
| 8,826,439 B1 * | 9/2014 | Hu | ......................... | G06F 21/563 726/24 |
| 8,839,369 B1 * | 9/2014 | Dai | ......................... | H04L 63/10 713/178 |

(Continued)

*Primary Examiner* — John B King
(74) *Attorney, Agent, or Firm* — Benjamin Aaron Adler

(57) ABSTRACT

A comprehensive scheme to detect phishing emails using features that are invariant and fundamentally characterize phishing. Multiple embodiments are described herein based on combinations of text analysis, header analysis, and link analysis, and these embodiments operate between a user's mail transfer agent (MTA) and mail user agent (MUA). The inventive embodiment, PhishNet-NLP™, utilizes natural language techniques along with all information present in an email, namely the header, links, and text in the body. The inventive embodiment, PhishSnag™, uses information extracted form the embedded links in the email and the email headers to detect phishing. The inventive embodiment, Phish-Sem™ uses natural language processing and statistical analysis on the body of labeled phishing and non-phishing emails to design four variants of an email-body-text only classifier. The inventive scheme is designed to detect phishing at the email level.

19 Claims, 12 Drawing Sheets

(56) References Cited

U.S. PATENT DOCUMENTS

| | | | |
|---|---|---|---|
| 2004/0260776 A1* | 12/2004 | Starbuck | G06Q 10/107 709/206 |
| 2007/0094500 A1* | 4/2007 | Shannon | G06F 21/645 713/170 |
| 2008/0028444 A1* | 1/2008 | Loesch | G06F 17/30902 726/4 |
| 2010/0205123 A1* | 8/2010 | Sculley | G06F 21/562 706/12 |
| 2011/0296524 A1* | 12/2011 | Hines | G06F 21/552 726/22 |
| 2012/0197896 A1* | 8/2012 | Li | H04L 29/08072 707/740 |
| 2012/0303439 A1* | 11/2012 | Flitcroft | G06Q 10/107 705/14.36 |
| 2014/0033307 A1* | 1/2014 | Schmidtler | H04L 63/1483 726/22 |

\* cited by examiner

```
Input: SMTP server name, user name, password
Output: Label for each email: Phishing or Legitimate
1  Fetch email from SMTP server
2  if (new email downloaded) then
3      foreach email e do
4          header h = extractHeader();
5          if (h indicates that e is HTML encoded) then
6              decodedEmail dE=HTMLDecode(e);
7          end
8          parsedEmail pE = emailParser(dE);
9          headerScore = headerAnalysis(header);
10         linkScore = linkAnalysis(links);
11         textScore = textAnalysis(text);
12         cs = combineScore(headerScore, linkScore, textScore);
13         if cs ≥ 2 then
14             Output Label: Phishing
15         end
16         else
17             Output Label: Legitimate
18         end
19     end
20 end
```

FIG. 2

Input: SMTP server name, user name, password
Output: Label for each email: Phishing or Legitimate 1 Fetch email from SMTP server
2 if *(new email downloaded)* then
3     foreach *email e* do
4         header h = extractHeader();
5         if *(h indicates that e is HTML encoded)* then
6             decodedEmail dE=HTMLDecode(e);
7         end
8         parsedEmail pE = emailParser(dE);
9         headerScore = headerAnalysis(header);
10        linkScore = linkAnalysis(links);
11        cs = combineScore(headerScore, linkScore);
12        if $cs \geq 1$ then
13            Output Label: Phishing;
14        end
15        else
16            Output Label: Legitimate;
17        end
18     end
19 end

FIG. 3

P = % phishing detected on 1365 phishing emails
I = % false positives on 3000 non-phishing Enron Inbox emails
S = % false positives on 4000 non-phishing Enron Sent emails

| Classifier | P | I | S |
|---|---|---|---|
| Classifier 1 | 92.88 | 4.96 | 4.17 |
| Action-Detector | 73.6 | 1.92 | 1.96 |
| Nonsensical-Detector | 12.84 | 2.87 | 2.21 |
| Other | 6.44 | 0.17 | 0 |
| Classifier 2 | 92.01 | 4.88 | 3.9 |
| Action-Detector | 72.23 | 1.4 | 1.76 |
| Nonsensical-Detector | 13.34 | 3.31 | 2.14 |
| Other | 6.44 | 0.17 | 0 |
| Classifier 3 | 94.8 | 2.16 | 2.37 |
| Action-Detector | 75.1 | 0.5 | 0.72 |
| Nonsensical-Detector | 13.3 | 1.49 | 1.65 |
| Other | 6.44 | 0.17 | 0 |
| Classifier 4 | 95.02 | 2.24 | 2.42 |
| Action-Detector | 75.82 | 0.57 | 0.77 |
| Nonsensical-Detector | 12.74 | 1.5 | 1.65 |
| Other | 6.44 | 0.17 | 0 |

FIG. 9

AUTOMATIC PHISHING EMAIL DETECTION BASED ON NATURAL LANGUAGE PROCESSING TECHNIQUES

CROSS-REFERENCE TO RELATED APPLICATIONS

This is a continuation-in-part under 35 U.S.C. § 120 of pending nonprovisional application U.S. Ser. No. 14/015,524, filed Aug. 30, 2013, the entirety of which is hereby incorporated by reference.

BACKGROUND OF THE INVENTION

Field of the Invention

The present invention generally relates to the field of cyber security. More specifically, the present invention relates to a method and algorithm that detect phishing emails based on natural language processing techniques.

Description of the Related Art

The Internet has become an integrated part of our working or daily lives. With more and more sensitive formation for personal, business or even national security made accessible online, cyber security solutions have one of the most serious issues in the society.

Among various cyber security issues, phishing attacks are one of the most dangerous types. In general, phishing refers to a social engineering threat that aimsatgleaning sensitive information from unsuspecting victims. Phishing attacks are usually carried out via communication channels such as email or instant messaging by "attackers" posing as legitimate and trustworthy entities.

Consequently, many research groups have studied phishing detection from various perspectives including server-side and browser-side strategies, education/training, and evaluation of anti-phishing tools, detection schemes, and studies that analyze the reasons behind the success of phishing attacks.

There are essentially two primary classifications of phishing detection schemes. The first type refers to schemes that detect phishing based on analyzing content of the target web pages, i.e. analyzing the web pages whose links are within the email. The second type are schemes that operate directly on the content of the emails.

The schemes for detecting phishing attacks (email and web pages) in the literature can be broadly classified into three categories comprising schemes based on information retrieval, machine learning based techniques, and string, pattern and visual matching based detection schemes.

A typical approach to detect phishing using web page content is analyzing the structure of the URLs and validating the authenticity of the content of these target web pages. One such scheme is based on information retrieval and text mining algorithms. Other researchers studied detecting phishing web pages based on visual similarity and on using watermarking techniques to thwart phishing.

Furthermore, some current schemes identify phishing URLs by analyzing only the structure of the links and not the content of the target web pages. Some features are described that can be used to distinguish a phishing URL from that of a benign URL. These features are used to detect phishing URLs. For example, an algorithm is made available, which uses the phishing data provided by the anti-phishing working group (APWG) to extract generic characteristics of hyperlinks embedded in phishing emails.

Moreover, there are phishing detection schemes at the email level, which use machine-learning techniques on a feature set. In general, a classifier is trained on a set of features extracted from the email. After the training, this classifier is used to detect phishing emails from the email stream. Some of the common features are: presence or absence of JavaScript, HTML/plain-text email, IP addressed URLs, number of links/domains/dots, etc. However, for machine learning phishing detection scheme, these filters need to be updated on a regular basis.

One current scheme employs a heuristic algorithm that performs simple header, link and a cursory text analysis (scanning for the presence of certain text filters) of incoming emails. Some researchers have studied the evolution of phishing email messages and developed a classification of phishing messages into two groups: flash and non-flash attacks, and classify phishing features into transitory and pervasive. However, both methods lack of accuracy due to simplified analysis process. A study conducted on the anatomy of phishing emails used a database of fraudulent emails received by the associated organization in an effort to understand the structure of a phishing email in addition to unraveling the most common tricks used by phishers.

Therefore, there is a recognized need in the art for a phishing detection method that does not need frequently updating filters, and that can accurately determine phishing emails without the need to visit the potential phishing websites. Particularly, the previous art is deficient in this aspect. The present invention fulfills this long-standing need and desire in the art.

SUMMARY OF THE INVENTION

The present disclosure relates to a comprehensive and effective natural language based scheme for detecting phishing emails.

One embodiment of the inventive scheme, PhishNet-NLP, is a comprehensive scheme that makes use of all the information present in an email, except attachments, to ascertain which class it belongs to: phishing or legitimate. The embodiment makes use of information present in the email header, text in the email body, and the links embedded in the email. Inventive techniques are employed to process the header and link information, and deeper natural language techniques are used to process the text information.

Natural language processing (NLP) by computers is well recognized to be a very challenging task because of the inherent ambiguity and rich structure of natural languages. The level of difficulty associated with NLP could be a reason why previous researchers have not used NLP techniques for email phishing detection. Despite this difficulty, two of the inventive schemes described herein match or outperform most existing phishing detection strategies in the literature and has been shown to obtain a phishing detection rate of about 97% or better with very low false positives of about 0.7-0.8%.

The inventive scheme is built on the observation that the fundamental difference between a phishing and a legitimate email lies in its objective. While a legitimate email typically conveys some information to the reader, a phishing email is designed to elicit a response. This response often involves making the reader click a link with the intention of obtaining sensitive personal information. None of the detection schemes in the literature available appear to make use of this distinction to detect phishing emails. The inventive scheme is designed specifically to distinguish between "actionable" and "informational" emails, focusing on objectives that are typical of phishing emails—language that intends to create a sense of urgency, threat, worry, concern or offers an incentive to the user to perform an action.

One embodiment of the inventive scheme uses feature selection by applying statistical tests on a set of email texts that are labeled as either phishing or non-phishing. The features are then used to create a classifier that distinguishes between informational and actionable emails. The results show that the feature selection significantly boosts the performance of the phishing classifier.

One embodiment of the inventive scheme uses contextual information (when available) to detect phishing. The problem of phishing detection is studied within the contextual confines of the user's mail box and it is shown that context plays an important role in detection to help minimize the detection time, computation involved in the detection, and finally to conserve bandwidth by limiting expensive online queries.

Contextual phishing detection outperforms many other non-contextual detection schemes in the current literature and appears to be the first contextual scheme known in the field. Additionally, the use of context information makes the inventive scheme robust against attacks that are aware of the inventive scheme's methods.

Detecting phishing at the email level rather than detecting fraudulent and masqueraded websites after the website has been visited by the user is one strategy employed in the inventive embodiments. One inventive embodiment operates between a user's mail transfer agent (MTA) and mail user agent (MUA) and processes each arriving email for phishing attacks. This prevents the user from clicking any harmful link in the email. This approach is in contrast to schemes that analyze the target websites for authenticity. The motivation to operate at the email level is due to the fact that clicking on the link and visiting a phishing website exposes the user to potential malware that could be installed by the website. Furthermore, the objective is to maximize the distance between the user and the phisher—clicking a malicious link puts the user closer to the threat. The added advantage of this approach is that internet service providers (ISPs) and email providers may now be able to prevent such emails from being delivered to the user thereby saving precious bandwidth as well.

Another inventive embodiment devises two independent, unsupervised classifiers, namely the link and header classifiers, and two combinations of these classifiers. This embodiment appears to be the first of its kind to make use of all facets of header and link information available in an email. This scheme is completely unsupervised, requiring no corpus of emails and no training. One such embodiment, Intersection, appears to match or outperform most existing phishing detection strategies in the literature and has a phishing detecting rate of about 93% or better with low false positives of about 0.5%. Another embodiment, Union, has a phishing detection rate over 99% with a false positive rate of about 6%.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following Figures and detailed description. It is intended that all such additional systems, methods, features and advantages that are included within this description, be within the scope of any claims appended below.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 2 shows an algorithm for the PhishNet-NLP (embodiment used to detect phishing emails using header, link and text analysis.

FIG. 3 shows Algorithm 2 for the PhishSnag embodiment used to detect phishing emails using header and link analysis.

FIG. 9 shows the performance results for the text-only classifier PhishSem.

Figure 1:
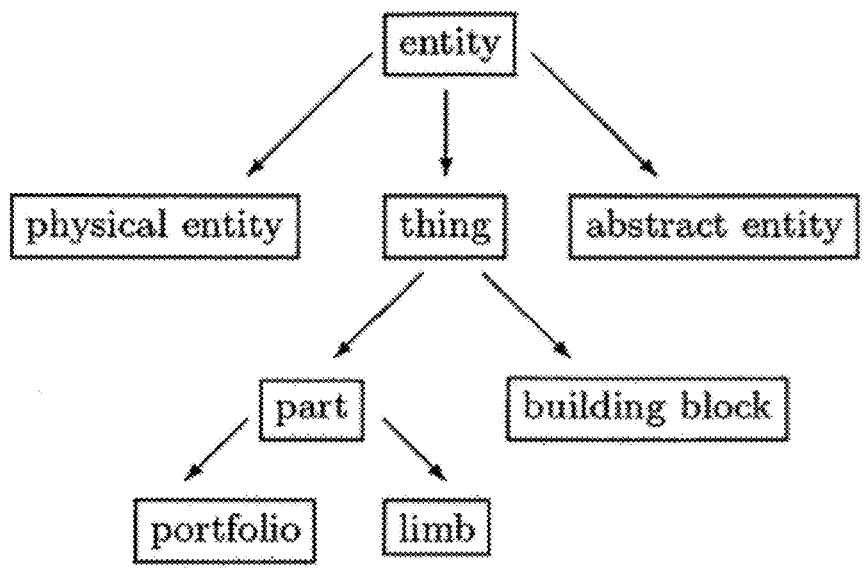
FIG. 1 shows a tiny WordNet hypernymy tree.

Note that many of the functions may be reordered without adversely affecting the effectiveness of the embodiments and the choice of ordering in such cases is purely exemplary. Note also that the text-only classifier PhishSem can be combined with header and link analysis yielding a comprehensive phishing email detection engine just as in PhishNet-NLP.

DETAILED DESCRIPTION

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention, there is provided a computer-implemented method for detecting phishing attacks comprising the steps of receiving an email containing at least one link; separating the email into a link part, a header part and a body part; extracting information from the header part, link part and body part of the email; conducting text analysis to the body part of the email; conducting header analysis to the header part of the email; and conducting link analysis to the link part of the email; classifying the email based on results of text analysis, header analysis and link analysis. In this embodiment, a message ID and subject information is extracted from header part of the email.

In this embodiment, natural language techniques are applied in the text analysis, header analysis and link analysis. The natural language techniques comprise syntax analysis, statistical analysis, semantics analysis or a combination thereof. In this embodiment, the text analysis is enhanced by feature selection techniques.

In this embodiment, the feature selection techniques comprise the steps of grouping candidate features from text of the email; and selecting the combination of features used in phishing email detection, the candidate feature comprises words from the body part, subject information from the header part, the parts-of-speech tags of the words, the sense of each word or a combination thereof.

In this embodiment, the candidate features are grouped based on a technique comprising pattern matching, or statistical analysis of the candidate feature. The pattern matching comprises syntactic analysis, statistical analysis, semantic analysis or a combination thereof. In this embodiment, pattern matching is configured to select a combination of features used for detecting a phishing email.

Further in this embodiment, the part of speech tags comprise tagging body part of the email based on part of speech; determining the email as an action-seeking email or descriptive email; and refining selected candidate features.

Further still in this embodiment, the sense of each word technique comprises tagging the body part of the email based on contextual sense of each word using natural language processing techniques; determining the email as an action-seeking email or descriptive email; and refining selected candidate features.

In this embodiment, a lexical database for the text of the body part of the email is incorporated to expand the set of selected features to further enhance phishing email detection. A lexical database for the language of the body part of the email is configured to determine the email as an action-seeking email or descriptive email.

Further in this embodiment, the header analysis comprises tracing a path of delivery of the email using the information extracted from the header part; analyzing a string of domain names in the header domain using Character N-gram analysis; applying machine learning classifiers based on the analyzing step; and determining the email is phishing based the machine learning classifiers. Representative examples of the machine learning classifier include, but are not limited to, Random Forest classifier, J48 decision tree, Sequential Minimal Optimization algorithm, Bootstrap Aggregating, Attribute Selected Classifier, Bayesian Logistic Regression classifier, Naive Bayes Multinomial classifier, or a combination thereof.

Further still in this embodiment, the link part analysis comprises web searching, batch machine learning method, online machine learning method or a combination thereof. The web searching comprises searching information extracted from the body part link part of the email through Internet, or searching a public phishing blacklist. The batch machine learning method comprises developing an email classifier based on extracted information from the link part. Exemplary online machine learning methods include, but are not limited to Perceptron, Averaged Perceptron, Passive Aggressive, Passive-Aggressive I, Passive-Aggressive II, Confidence Weighted, or a combination thereof. In this embodiment, the email classifier is developed based on a class of feature comprising Character N-grams.

In another embodiment of the present invention, the computer-implemented method further comprises developing a context history database containing the extracted information and phishing and/or non-phishing label for each received email configured to determining a new email as a phishing email or non-phishing email based on similarity between the new email and information in the context history database.

Figure 4:
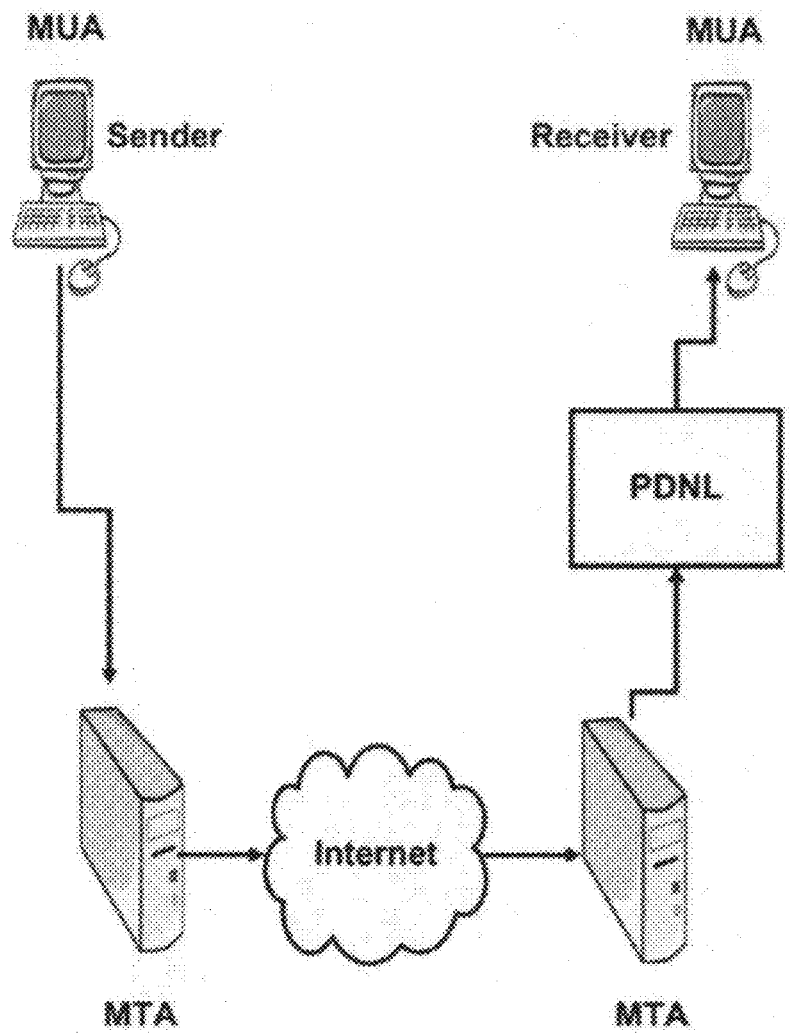
FIG. 4 shows a prototype implementation of all the embodiments in a computer system.

Provided herein are methods and algorithm that detect phishing emails based on natural language processing techniques. Generally, in an overview, the phishing detecting system operates between a user's mail transfer agent (MTA) and mail user agent (MUA) and processes each arriving email for phishing detection using Natural Language Techniques (PDNL) (FIG. 4).

Text Analysis Scheme

One embodiment of the enclosed inventive scheme is based on a context based text analysis of emails. This particular disclosed embodiment appears to be the first scheme to utilize natural language based techniques, and context information when available, to detect phishing. One such embodiment, referred to as PhishNet-NLP, operates by inferring the "intention" of the email—whether it is informational or actionable. Based on current experimentation, the phishing detection rate associated with the inventive scheme is at least 97% with very low false positives (about 0.7%-0.8%). PhishNet-NLP also utilizes all of the information available in an email, namely, the header, links and text of an email. The embodied scheme may also operate in the default mode and perform phishing detection in the absence of any history (this feature being under the control of the user). When prior history is available, the embodied scheme takes advantage and improves the detection capability. Finally, the embodied scheme is designed to detect phishing at the email level rather than detecting fraudulent, masqueraded websites thereby protecting the user in a comprehensive manner.

The embodiments may make use of Term Frequency-Inverse Document Frequency (TF-IDF). In information retrieval TF-IDF is a weight used to determine the importance of a word to a document in a collection of documents. The Importance of a word increases proportionally to the number of times a word appears in the document (term frequency) and is inversely proportional to the document frequency of the word in the collection. The IDF is a measure of the discriminating power of the term. It measures how common a term is across an entire collection of documents. Thus, a term has a high TF-IDF weight by having a high term frequency in a given document and a low document frequency in the whole collection of documents.

One embodiment of the inventive scheme, PHISHNET-NLP is comprised of many steps. The first step may be referred to as parsing, which involves accepting an incoming email from the MTA and parsing it into its constituent components: header, links, and text. If the email is HTML encoded, as indicated by the header, the HTML email body is further decoded to plain text to perform further analysis. The header, links, and text, are analyzed through their respective classifiers and majority voting is performed on the scores obtained from the analysis classifiers to determine whether the email is legitimate or phishing.

Majority voting is used as opposed to considering certain weight factors for each of the individual classifiers in order to assign an equal importance to each of the classifiers. Under the assumption of independence, the majority voting approach has better coverage (accuracy) than that of each individual classifier whenever each classifier in the combination has better than a 50% coverage (accuracy). Majority voting also may help to avoid the following problems: (i) how to compute optimal weights, which requires a training corpus, and (ii) the optimal weight combination is likely to be different for different corpus and users.

The email text may be analyzed and given a score, referred to as Textscore herein. When the context information of an email is available, which is defined as the other saved emails of the user's mailbox, both sent and received, PhishNet-NLP may use the context to generate a score called Contextscore for the email as well. The user is given full control over PhishNet-NLP's context analysis option: whether or not to use context analysis, the context size to use for context analysis, and the date at which the context should start. In one embodiment, context size could be specified in two ways: number of emails or a date range. When the context option is used, the two scores, the Contextscore and the Textscore, are combined logically.

A semantics-based method may be employed to generate the Textscore of the email as well. The semantic approach may employ the following NLP techniques, including but not limited to: lexical analysis, part-of-speech tagging, named entity recognition, normalization of words to lower case, stemming and stopword removal.

The goal of lexical analysis is to split the email into sentences and each sentence into words.

The part-of-speech tagging phase tags each word with its part-of-speech, namely, noun, verb, etc.

Named entity recognition tags the named entities in the email, which are nouns that name person, location, or organization. Words are converted to lower case in a normalization phase. The goal of stemming is to reduce each word form to its root or stem. One such program for stemming is the Porter stemmer.

The textAnalysis Classifier of some embodiments may employ WordNet. WordNet combines features of both a dictionary and a thesaurus. The building block in WordNet is a synset (a set of synonyms), which consists of all the words that express a given concept, and the basic semantic relation in WordNet is synonymy.

The semantic relation that is the most important in organizing nouns into a hierarchy is the hyponymy relation between synsets. Hyponymy is the relation of subordination (or class inclusion or subsumption). The key point to be noted is that although the hypernymy relation is defined on synsets in WordNet, it could be the case that a synset can have more than one hypernym. However, this situation is not frequent for nouns. On the other hand, for verbs the situation is quite different and the hyponymy structure is not even acyclic. The relation between verbs to other verbs may be used by the inventive embodiments.

The hyponymy relation between verbs may be employed and is defined as follows: A is a hypernym of B if the meaning of A encompasses the meaning of B (B is called the hyponym). All nouns in WordNet are stored in a graph (that is close to a tree) that represents the hypernymy hierarchy. The word entity is the root of the tree, because it is believed to encompass the meaning of all other nouns. Traversing down the tree manifests more specific nouns as shown in FIG. 1 of a small portion of the hypernymy tree. All verbs in WordNet are arranged in a hypernymy graph as well, but for verbs this graph is "forest-like" but not a forest due to the presence of cycles. The word sense disambiguation software may need to be invoked before calling the WordNet program because a synset is designed to refer to a single concept and hence the need to disambiguate words in the document to find the correct synset for a noun. As an example, the word "plant" could mean a factory in one context and could mean a tree in another context. Hence the word plant would be found in two different synsets in this case.

The aim of stopword removal is to remove common words such as it, a, an, the, etc. Stopword removal may include removal of common suffixes such as Jr., Sr., II, etc., after names and prefixes such as titles like Dr., Prof., Mr., Ms., etc. For this purpose a stopword list may be used.

Semantic NLP techniques, namely word-sense disambiguation and WordNet, may be used as opposed to purely syntactic or statistical ones based on feature counting. The sense or meaning of a word depends on its context. The goal of word-sense disambiguation is to find the appropriate sense of a word based on the context PhishNet-NLP utilizes deeper word analysis by extracting important words from the email text, tagging them with their senses based on the surrounding contexts of the words, and using these to query WordNet. These distinguished words may be called keywords. The sense of the word may be used in locating the word in the WordNet hypernymy tree and to generate a score for the word as described below. SenseLearner may be employed for word sense disambiguation and TextRank may be employed for keyword extraction. In one instance, SenseLearner was trained using the SemCor 2.1 database, which was compiled using WordNet 2.1 but other methods may be employed.

The inventive scheme may be carried out by an analysis detailed and described herein, but other analysis techniques may be employed. For a user u, let Basic-Names(u) denote the lower-case versions of u's last name, first name, middle name(s), if any, and their common spelling variants. This set may be initialized by the user. Let Names(u) denote all permutations of words from Basic-Names(u) taken two at a time, three at a time, and so on until |Basic-Names(u)| at a time (where |S| denotes the size of set S). For an email text, e, let Named-entity(e) denote the set of named entities in e, ignoring only the greeting part of the email, which may be identified easily as a sentence fragment using parsing, or heuristics such as missing verb and presence of named-entity from Names(u). If |Named-entity(e)−Names(u)|=0, then email e receives an overall Textscore of 0, where a score of 1 represents phishing and 0 represents a legitimate email. Phishing emails are very likely to mention at least one institution in the body of the email. Next, assume that |Named-entity(e)−Names(u)|.gtoreq.1. Since determining the extent to which an email is actionable is the desired outcome, certain verbs in the body of the email are scored. If the email contains no text it is marked as phishing. This means the email has either links or attachments only and the classification of the email is based on the reasonable assumption that legitimate email senders usually write a brief explanation of the links or attachments that they are sending out.

Let V={click, follow, visit, go, update, apply, submit, confirm, cancel, dispute, enroll}. To each word in the set V, the appropriate verb sense (denoted by #v at the end of the word in WordNet) is attached. For any set X containing words along with a sense for each word, let Synset (X)={synset (x)|x.epsilon.X}, where synset (x) is the WordNet synset of x for the specified sense. For natural number i.gtoreq.1, let Hypo.sup.i (Synset (V)) denote the union of all the synsets reached by following up to i hyponymy links from the synsets in Synset (V). Let SV=Hypo.sup.4 (Synset (V)) be the set of special verbs. Note that the WordNet verb hierarchy is not a tree structure and is not even acyclic, which means that following the hyponymy links must be done together with cycle detection. Let SA=Synset({here, there, herein, therein, hereto, thereto, hither, thither, hitherto, thitherto}) with each word in this set SA having the adverb sense, and let U={now, nowadays, present, today, instantly, straightaway, straight, directly, once, forthwith, urgently, desperately, immediately, within, inside, soon, shortly, presently, before, ahead, front} (words conveying a sense of urgency), and D={above, below, under, lower, upper, in, on, into, between, besides, succeeding, trailing, beginning, end, this, that, right, left, east, north, west, south} (the set of direction words). The above word choices were chosen based on a study of some phishing emails previously received by inventors, and a scan of about 20 (0.4%) emails in the phishing email database, but other word choices may be used to achieve similar results. The examples presented give some of the possible scoring functions to obtain Textscore of an email when there is at least one named entity besides user name(s).

For the Contextscore, the email may be treated as a vector of TF-IDF values in the semantics space as opposed to traditional syntactic techniques after stopword elimination and stemming. Note that the TF-IDF scheme converts a vector of words to a vector of real values using the product of term frequency and inverse document (here, the document is the email) frequency. WordNet may again be employed for this purpose after part-of-speech (POS) tagging and word sense disambiguation. Words belonging to the same synset are represented by a common word in the vector. For instance, different forms of the same verb "is", "was", etc. are represented by the common verb "to be." Also, different verbs with the same sense and meaning such as "is," "exists", etc. are also represented by the verb "to be."

Then the similarity computation is performed between the email vector ev and the corresponding vector for each email in the context, say ec. For the similarity computation the cosine measure is adopted, Similarity(ev, ec)=cosine .theta., where .theta. is the angle between the two vectors. The smaller the .theta., the greater the similarity between two emails. Note, that other similarity methods can be adopted as well and the choice is purely exemplary. Finally, Contextscore (ev)=max.sub.ec.epsilon.CSimilarity(ev, ec). The size of the intersection is also computed by I|Named-entity (ev).andgate.Named-entity(ec)| for each email ec, with similarity of over high-threshold. If this intersection is null, then the Contextscore is lowered down to 0. If Contextscore is below low-threshold it is rounded down to 0. If it is above high-threshold and the size of the intersection is at least one, then it is rounded up to 1. Low-threshold and high-threshold are initially set to about 0.5 (an angle of about 60 degrees or higher) and about 3/2 (an angle of about 30 degrees or lower) respectively and can be fine-tuned further, if necessary, based on experiments. No rounding is performed if Contextscore is between low-threshold and high-threshold.

For efficiency purposes PhishNet-NLP saves the vocabulary and named-entity information for the context examined, and the corresponding vectors for the emails examined in a database for subsequent reuse. Multiple indices can be constructed on this information for efficient retrieval based on the context options provided in PhishNet-NLP.

In an exemplary embodiment, Textscore(e) and Contextscore(e) may be combined to yield Final-text-score(e). If no context information is available, Final-text-score(e)=1 if Textscore(e).gtoreq.1, otherwise Final-text-score(e)=0. When context information is available, the following procedure may be used: if Contextscore(e)=1 and any one of the emails that yield the maximum similarity score is marked as dangerous (phishing) by the user, the Final-text-score(e)=1. If Contextscore(e)=1 and all of the emails that yield the maximum similarity score are marked safe (legitimate) by the user, then Final-text-score(e)=0. If Contextscore(e)=0, then the email is not very similar to any email in the context. In this case, Final-text-score(e)=0 if Textscore(e)<1, otherwise Final-text-score(e)=1. If low-threshold<Contextscore (e)<high-threshold, then the email has moderate similarity to some email in the context. In this case, if Textscore(e)<1, then Final-text-score(e)=0, else Final-text-score(e)=1.

If user input is acceptable (or if the user chooses interactive mode), then the user could be queried to determine whether the email has arisen from some past action of the user. This could be useful in two "gray" areas where Contextscore is between low and high threshold and Textscore is less than 0.5, and Contextscore is zero and Textscore is between 0.5 and 1. If 0.5.ltoreq.Textscore(e)<1, the user could be prompted to determine if the email has arisen from some past action of the user. If yes, Final-text-score(e)=0, otherwise Final-text-score(e)=1. In order to simplify the logical combination, the context score may be rounded down to 0 if it is between about 0 to 0.866 (angle greater than about 30 degrees) and rounded up to 1 otherwise. These thresholds were not fine-tuned using the data but can be if desired. To maintain user's privacy, context analysis can be a separate application that works under user control without downloading user emails into its space.

The header analysis classifier employed in the inventive scheme differs from the routine presented by other available schemes in several aspects including, but not limited to: (i) dealing with email forwarding issues, (ii) making use of DomainKeys Identified Mail (DKIM) and Sender Policy Framework (SPF) information whenever they are available, and (iii) accounting for the differences in the headers based on whether the email is sent from a mobile device or relayed by multiple servers in the user's domain. The headerAnalysis( ) classifier performs analysis on the data from the extracted headers to determine whether the email is phishing. A possible first step may request that the user input his/her other email addresses that forward emails to this current email address and this information is stored. It can be assumed that these forwarding email accounts and the Local Host also have PhishNet-NLP or other embodiments described herein installed.

A possible first phase of this header classifier embodiment involves extracting the data. The FROM and DELIVERED-TO fields are extracted from the header. Then, the RECEIVED FROM field(s) may be extracted and looked at in order, starting with the first such field and then the next such field, if present, and so on.

The received from field(s) may be extracted as follows: If the Received From section of the email contains a DKIM signature then store the Signing Domain Identifier [SDID]. Otherwise, if there is a Received-SPF field below a Received From field, then first store the Received From field. Additionally, if the SPF query returns "pass," and if the domain in the From Field accepts an IP address as a permitted sender in the Received-SPF field, perform an NSLOOKUP on this IP address and store the domain name corresponding to this IP address in the variable SPFQuery. Otherwise, store the RECEIVED FROM field.

A possible second phase involves verifying the data. The data may be verified as follows: If the first Received From field has the same domain name as the FROM FIELD or LOCALHOST or ANY FORWARDING EMAIL ACCOUNT, or if the NSLOOKUP on the IP address of the permitted sender in the Received-SPF field yields the same domain name stored in the variable SPFQuery, then this email is legitimate. Otherwise, if the first Received From field has the same domain name as the user's current email account's domain name, then look at the next received from field. Otherwise, mark the email as phishing.

The link analysis classifier of the inventive scheme is used to determine whether the URLs present in the email point to the legitimate websites that the text in the body of the email claims. All domains may be extracted from the links in the email into an array (let this array be called DOMAINS). The linkAnalysis( ) classifier assigns an email a score of 1 for phishing and 0 for legitimate as follows: If the length of DOMAINS is 0 (no links), the email is legitimate. If the email has more than 10 distinct words, calculate the top four terms in the email using the TF-IDF scores. The IDF value of a word can be obtained in many ways, for example, doing a GOOGLE search for the word, and obtaining the number of web pages in which it appears, or by using a standard NLP corpus. If the GOOGLE search approach is adopted, the search information, together with the total number of web pages in GOOGLE's database, can be used to calculate the IDF value for each word. However, note that GOOGLE returns only a somewhat loose upper bound on the number of web pages containing the word for efficiency purposes, which is progressively refined as the user examines the search results list. For this reason and the fact that GOOGLE. discourages frequent automated searching, the email database itself was used to estimate the IDF value in this embodiment. GOOGLE search each domain together with the top four terms. Other search engines may also be used. Otherwise, if the total number of distinct words in the email is less than 10, then GOOGLE search each domain. If all domains appear in the top 30 results returned by the GOOGLE search, then mark the email as legitimate, otherwise phishing. The reason for insisting on 10 words as a threshold is to offset the very small likelihood of obtaining at least four content words in a text fragment that is shorter.

Recall that a score of 1 represents phishing and 0 stands for legitimate. If the combined score of the three classifiers (header, link and text) is .gtoreq.2, PhishNet-NLP labels the email phishing, otherwise it labels it legitimate.

On a database of 2000 phishing emails (using the same phishing corpus as a current phishing scheme available), the percentage of emails that are marked by PhishNet-NLP as phishing is over 98% compared to other phishing schemes that had results in the low 80%. On 1000 legitimate emails, PhishNet-NLP marked 99.3% of the emails as legitimate compared to 99% for other phishing schemes. However, note that the legitimate email databases are different in this case since the authors of other schemes do not mention how they collected their legitimate emails.

Coverage was therefore increased by about 18% for the phishing emails while obtaining higher accuracy. Furthermore, the header analysis classifier incorporated into the inventive scheme is more advanced than other available schemes in the sense that it also deals with email forwarding issues and accounts for the differences in the headers based on whether the email is sent from a mobile device or relayed by multiple servers in the user's domain.

The header analysis scheme goes beyond that of other available schemes and examines DKIM signatures and SPF fields when available. Although the phishing corpus emails were collected five to eight years ago, it is still considered a good database since phishing sites are so short-lived that the link analysis results should not change significantly even when run on more recent phishing emails. Other experiments performed were focused on the detection of masqueraded web pages rather than on phishing emails and experimented with only 100 websites. Still, a much higher false positive rate was shown for legitimate web pages and lower coverage of masqueraded sites. Moreover, other available algorithms exhibit a tradeoff between coverage and accuracy. In contrast, the first run coverage of the present inventive scheme (without context information) is never lower than about 97.7% for the largest phishing database (which contained about 4550 phishing emails) and simultaneously achieves high accuracy with high coverage.

Other schemes researched apply machine learning techniques on a set of about 860 phishing emails, and about 6950 non-phishing emails, and are able to correctly identify about 92% of the phishing emails with about 0.1% false positive rate. Using structural properties of emails, some available schemes were able to detect 95% of phishing emails but do not explicitly state their false positive percentages. It is important to note that the above mentioned machine learning approaches require a training corpus of emails whereas the inventive approach does not. The present results show that all three classifiers satisfy the minimum threshold needed for helping to improve the combined classifier since they are all above about 50% in coverage and accuracy. However, there is some dependence between the text analysis and link analysis classifiers since one analyzes links and the other uses the presence of links in its scoring. However, because links are central to phishing via emails, this trade off is acceptable.

The relatively lower percentage of phishing emails detected by textAnalysis( ) in two large mail boxes is explained by the imprecision of NLP tools and the following three types of emails: foreign language, emails with unusable text, and emails with tables and pictures and insufficient text. Also, in each individual mailbox, the 2nd run produced an increased phishing detection by the textAnalysis( ) classifier and a small increase in the overall phishing detection. This is a direct consequence of the effect of the Context Score, which was not available in the first runs, but available in the 2nd runs after the first runs assigned scores to each email in the database. A higher detection rate could possibly be achieved on the first run of textAnalysis( ) by using the previous context of the first N emails when processing email N+1. However, it may be preferred to keep a fixed context for analysis of each email rather than a growing context, since in this case the present results are insensitive to the order in which emails are processed.

In one embodiment PhishNet-NLP was implemented using Perl v5.12.4, WordNet version 2.1 and SenseLearner 2.0, but other implementations can be utilized. In one embodiment the Stanford POS tagger 2006-05-21 and Stanford Named Entity Recognizer 1.0 were used. One implementation platform that may be used is a CORER (a trademark of Intel Corporation) 2 Duo 2.66 GHz processor, 4 GB RAM machine running 32 bit WINDOWS 7 (a trademark of Microsoft Corporation). CYGWIN (a trademark of Red Hat, Inc.) may be used for the POS tagger, NER, SenseLearner and WordNet.

Some of the challenges that may be faced during implementation are: 1) The GOOGLE. Search API would not perform frequent automated searches but random delay of 10 to 20 seconds may be used after every search to circumvent this issue, and 2) Parsing an email into the constituent header and body and then extracting the text and links may be challenging since most emails are HTML encoded and the headers do not always end with the same line format. Given that a random sleep time was necessary between subsequent GOOGLE searches, it may be desired to make use of different search engines for consecutive searches to eliminate this problem and possibly obtain better results.

Extracting data from emails relies on the use of regular expressions. From analyzing thousands of emails, it was observed that the message headers were formatted differently among them. A large number of email formats were studied to design the decoder (which decodes html if present, extracts info from the header and body and removes any attachments). If an attachment is present in an email, then the last portion of the message header contains one of the following: Content-Disposition: attachment or Content-Disposition: inline. This is followed by the encoded attachment file. This information was used to ignore all attachments.

Link and text analysis are very important and provide robustness to the inventive scheme. While the headerAnalysis( ) classifier alone shows very high coverage and high accuracy, the importance of link and text analysis stems from the fact that a sophisticated phisher can manipulate the originating "Received From", "From," and the "Delivered To" information to an extent.

Results from the LinkAnalysis show that it is very difficult to create a fraudulent link to bypass LinkAnalysis.

Unless the phishers have hacked into the mail server or the user's account, they would not have access to the context of the user's mailbox. Hence, it is likely that Context Analysis will also play a part in detecting such an email.

When someone hacks into an account in some domain and uses a friend list to attack any user in the same domain, headerAnalysis( ) may fail to detect this. But even in such a case, PhishNet-NLP can use the linkAnalysis( ) and textAnalysis( ) to mark the email as phishing since the intent of the email is to steal sensitive information by asking the user to click on a link for a malicious website. This even works for the scenario when user A's account is hacked and user A receives a phishing email. For example, if A's sensitive information is stored in an encrypted form.

Observe that with this implementation, textAnalysis( ) classifier will score the following email as phishing: "I found this video to be funny! Click on this link <legitimate link here>." This email will be scored as phishing even when coming from a genuine sender and a legitimate link. This is not a limitation of the inventive approach but actually a design feature of PhishNet-NLP. The reason is that both header and link analysis will have a high likelihood of returning a score of 0 (indicating legitimate) on such emails and therefore, the majority vote will be legitimate. While it may seem counterintuitive, is may be argued that such emails must be scored as phishing by the textAnalysis( ) classifier. For example, the consequence of a similar email, with a malicious link, being marked legitimate by textAnalysis( ) may be evaluated. Consider a sophisticated phisher who designs such an email with a malicious link. Let it be further assumed that the phisher is somehow able to successfully fool the headerAnalysis( ) classifier. Clearly, the majority vote would now indicate that this email is legitimate (the votes contributed by textAnalysis( ) and headerAnalysis( ) since linkAnalysis( ) would be the only classifier to indicate phishing) allowing the phisher to escape detection.

As of the present inventive scheme, emails in foreign languages or emails with insufficient text (only links or attachments) present a challenge to the textAnalysis( ) classifier which leads to a low phishing detection rate by the textAnalysis( ) classifier. By using context analysis to correctly identify the email as phishing this challenge could be offset.

For efficiency, PhishNet-NLP is designed to first execute headerAnalysis( ) and linkAnalysis( ) on the email that is being analyzed. If the sum of the scores of these two classifiers is equal to 1, only then will PhishNet-NLP execute textAnalysis( ) because if the combined score is either 0 or 2 from the first two classifiers, then the score from textAnalysis( ) cannot change the final output label of PhishNet-NLP). This feature was disabled during testing to obtain the results from each classifier.

As DKIM becomes widely deployed, sending domains will develop reputations as sources of spam or useful messages. It is thought that senders are not able to create covert sub-domains under their main domain (unless an authorized insider attacker is involved which may be unlikely) and cannot manipulate the "Received From" fields of legal intermediate MTAs. It is noted that it is not very easy to identify whether a "Received From" field is from a genuine intermediate MTA or just added by the phisher to confuse the header analysis. The highest probability for a "Received From" field of truly originating from a genuine intermediate MTA is the one closest to the recipient's domain, justifying the use of the closest MTA in the inventive scheme.

Header and Link Analysis

Another embodiment of the inventive scheme, referred to as PhishSnag, is a combination scheme and makes use of only the header and link information present in an email (except attachments) to ascertain which class it belongs to: phishing or legitimate.

Figure 5:
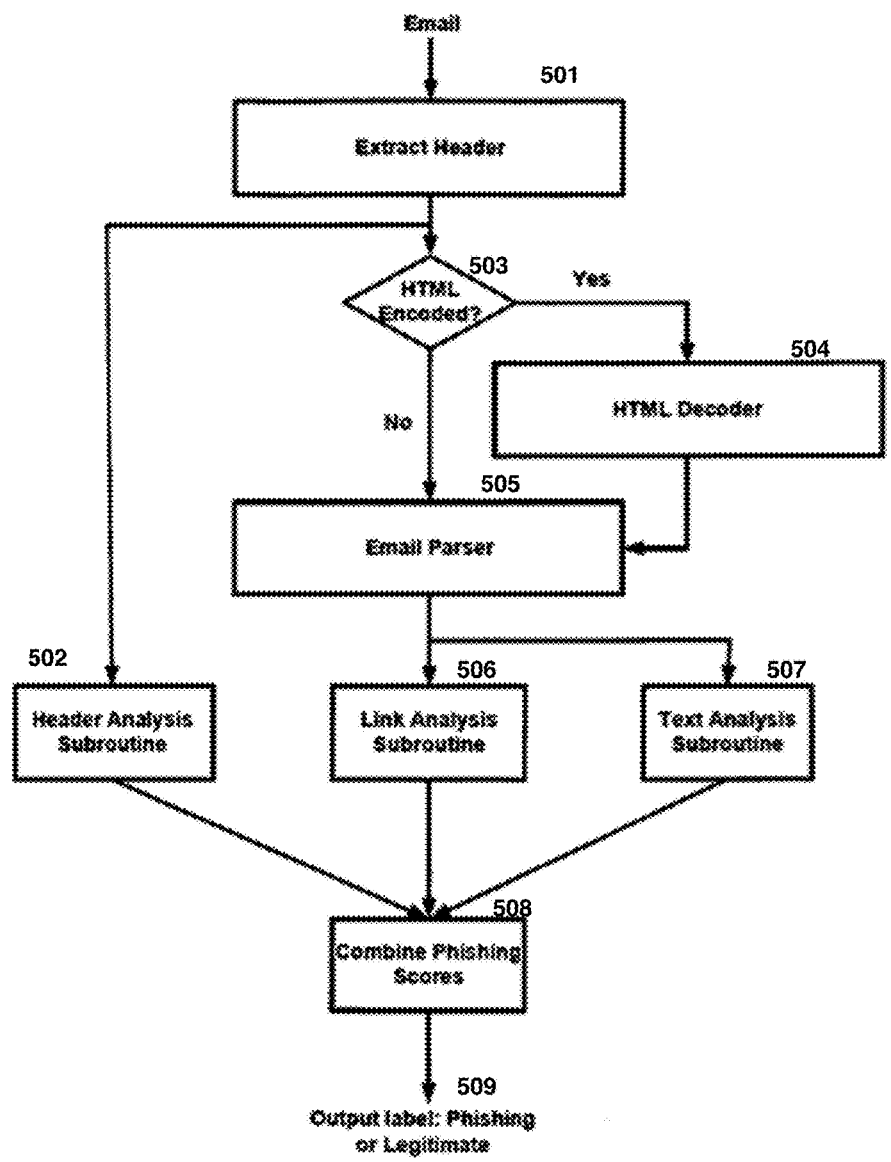
FIG. 5 is the flowchart for PhishNet-NLP embodiment.
Figure 7:
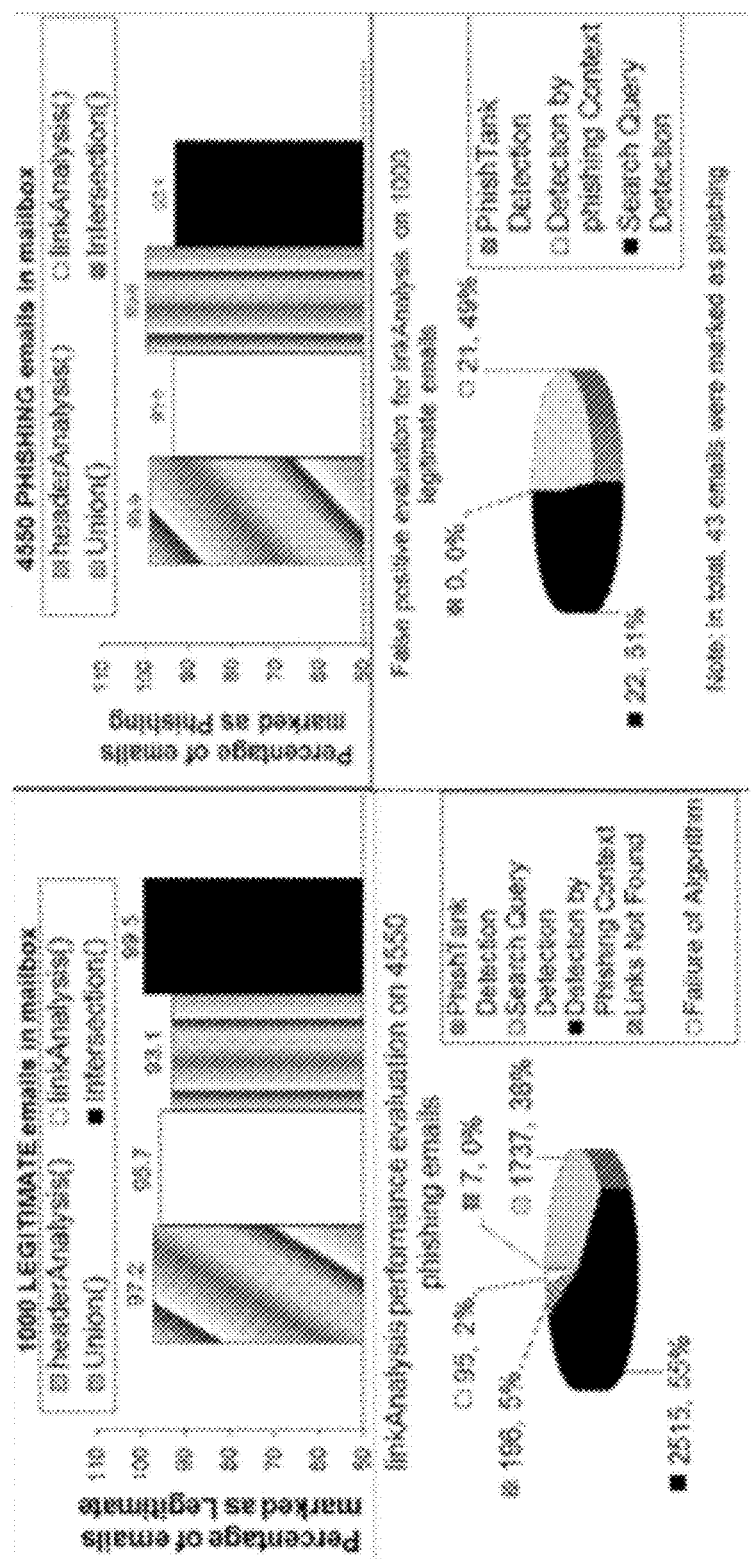
FIG. 7 shows results obtained from running the PhishSnag embodiment.

As shown in FIG. 5, the first step in the protocol of the embodiment may be parsing: where PhishSnag accepts an incoming email from the MTA and proceeds to parse it into its constituent components: header 501 and links. Then, a header analysis subroutine 502 is performed to the header of the email. If the email is HTML encoded 503, as indicated by the header, the HTML email body may then be decoded to plain text 504 and proceed to the email parser 505. If the email is not HTML encoded, it is directly sent to the email parser 505. After the Email is further parsed in to link and text, a link analysis subroutine 506 and a text analysis subroutine 507 are performed. A combined Phishing score 508 is calculated to determine the final label 509 for the email. Having obtained the header and links, each component may be analyzed through their respective classifiers (headerAnalysis and linkAnalysis) as discussed below. PhishSnag Union (PhishSnag Intersection) then labels the email as phishing if either (or both) of the classifiers, headerAnalysis( ) and linkAnalysis( ) report phishing. Results of exemplary runs of Phishnag on phishing emails sets of 1,000 and 4,550 emails are shown in FIG. 7.

FIG. 2 is a sample code (structure) for the described phishing mail determination method including header analysis, link analysis, and text analysis. The final score comprises a combined score of header score, link score and text score. FIG. 3 is a sample code (structure) for determining phishing emails. This method includes head analysis and link analysis but does not include text analysis. The final combined score is a combination of header score and link score.

The header analysis classifier employed in the inventive scheme differs from the routine presented by other available schemes in several aspects including, but not limited to: (i) dealing with email forwarding issues, (ii) making use of DKIM and SPF information whenever they are available, and (iii) accounting for the differences in the headers based on whether the email is sent from a mobile device or relayed by multiple servers in the user's domain. The headerAnalysis( ) classifier performs analysis on the data from the extracted headers to determine whether the email is phishing. A possible first step may request that the user input his/her other email addresses that forward emails to this current email address and this information is stored. It may be assumed that these forwarding email accounts and the Local Host also have PhishSnag (or other embodiments described herein such as PhishNet-NLP) installed.

The headerAnalysis( ) classifier may make use of DKIM and SPF information when available. DKIM is the core mechanism for signing and verifying e-mail messages. In DKIM, every organization (or person) has an "identity" which is captured using an identifier called the Signing Domain Identifier (SDID) and is contained in the DKIM-Signature header fields, thereby allowing an organization (or person) to take responsibility for a message in a way that can be verified by a recipient.

Sender Policy Framework (SPF) is an email validation system designed to thwart spam and phishing by detecting IP address spoofing. IP address spoofing is possible under the current implementation of the simple mail transfer protocol (smtp) that permits any computer to send emails claiming to be from any source address. To this end, SPF allows a domain administrator to specify which hosts on the domain are allowed to send email by creating specific SPF records in the Domain Name System. Receivers of a message can now check the SPF record and decide whether to accept or reject the message body, thereby reducing the bulk of spam and phishing messages delivered. The classifier described herein assigns an email a score of 1 for phishing and 0 for legitimate.

A possible first phase of this header classifier embodiment involves extracting the data. The FROM field may be extracted from the header. Then, the RECEIVED FROM field(s) may be extracted and looked at in order, starting with the first such field and then the next such field, if present, and so on. The received from field(s) may be extracted as follows: If the Received From section of the email contains a DKIM signature then store the Signing Domain Identifier [SDID]. Otherwise, if there is a Received-SPF field below a Received From field, then first store the Received From field. Additionally, if the SPF query returns "pass," and if the domain in the From Field accepts an IP address as a permitted sender in the Received-SPF field, perform an NSLOOKUP on this IP address, and store the domain name corresponding to this IP address in the variable SPFQuery. Otherwise, store the RECEIVED FROM field.

A possible second phase involves verifying the data. The data may be verified as follows: i. If the first Received From field has the same domain name as the FROM FIELD or LOCALHOST or ANY FORWARDING EMAIL ACCOUNT, or if the NSLOOKUP on the IP address of the permitted sender in the Received-SPF field yields the same domain name stored in the variable SPFQuery, then this email is legitimate; ii. Otherwise, the email may be marked as phishing.

The link analysis classifier of the inventive scheme is used to determine whether the URLs present in the email point to the legitimate websites that the text in the body of the email claims. All domains may be extracted from the links in the email into an array (let this array be called DOMAINS). linkAnalysis( ) is programmed to make use of a database of phishing URLs to detect fraudulent links. The described implementation may utilize the PHISHTANK (a registered trademark of OpenDNS, Inc.) database available online but other databases such as, APWG, GOOGLE Safe Browsing, etc. may be used as well. linkAnalysis( ) may also use the GOOGLE search engine and TF-IDF scores of the words in the email text to detect phishing links. Furthermore, it may store the phishing links detected by GOOGLE search into an array, building a context of fraudulent links, which can be used to reduce further GOOGLE queries and computations. Similarly, for efficiency purposes, linkAnalysis( ) may maintain a database of legitimate links, which are links verified by GOOGLE search as legitimate at least three times. Domain redirections may also be accounted for and subjected to the described analysis. The linkAnalysis( ) classifier may assign an email a score of 1 for phishing and 0 for legitimate as follows: If the length of DOMAINS is 0 (i.e. no links in email), then the email is legitimate. Otherwise, if any of the domains in the embedded email links match an entry in the PHISHTANK database, then the email is labeled phishing. Otherwise, if any of these domains match an entry in the phishing context database, then the email is labeled phishing. Otherwise, if the email has more than 10 distinct words, calculate the top four keywords in the email using the TF-IDF scores. The IDF value of a word can be obtained by either doing a GOOGLE search for the word and obtaining the number of web pages in which it appears, or by using a standard natural language corpus. GOOGLE search each domain together with the top 4 keywords. Otherwise, if the total number of distinct words in the email is less than 10, GOOGLE searches each domain. The reason for insisting on 10 words as a threshold is the very small likelihood of obtaining at least four content words in a text fragment that is shorter. If all domains appear in the top 30 results returned by the GOOGLE search, then mark the email as legitimate (score 0). Otherwise the email is marked phishing (score 1).

The phishing email list was obtained from an online phishing corpus. This corpus has been used by prior research and, according to authors, it is the first such phishing corpus publicly available. In addition to the online corpus above, personal email accounts were also used consisting of 1,000 legitimate emails. Four classifiers are presented—headerAnalysis( ) linkAnalysis( ) Union( ) and Intersection( ) as described below: i. Union( ) Classifier: If either headerAnalysis( ) OR linkAnalysis( ) reports PHISHING, then the email is labeled PHISHING; ii. Intersection( ) Classifier: If both headerAnalysis( ) AND linkAnalysis( ) report PHISHING, then the email is labeled then email is PHISHING.

Figure 6:
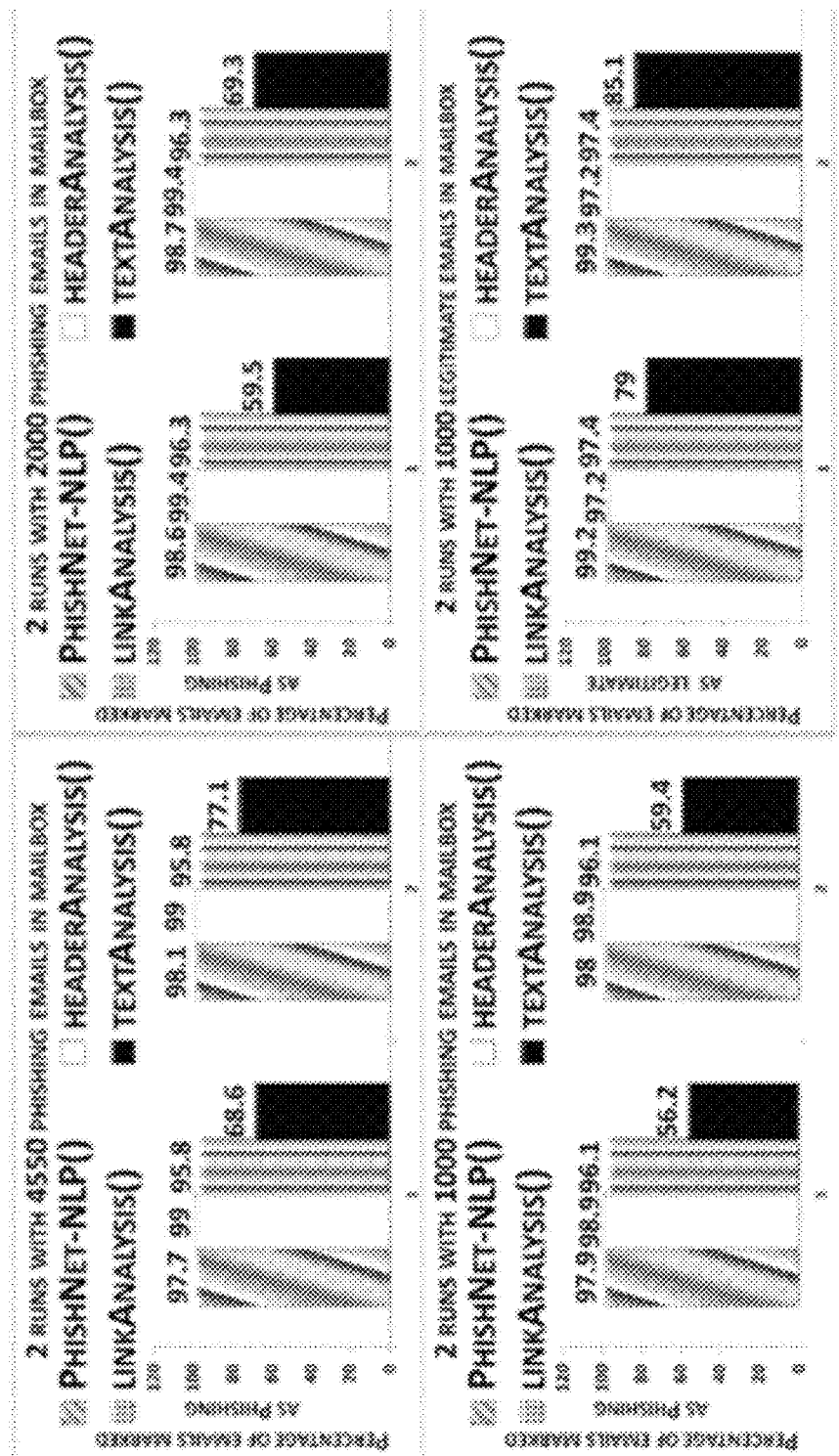
FIG. 6 shows results obtained from running the PhishNet-NLP embodiment.

In reference to FIG. 6, the numbers in the pie charts are in the format "count, percentage", where count stands for the actual number of the emails under that category in the pie chart and percentages are made over the 4550 emails in the first (left) pie chart and 43 false positives in the second (right) pie chart It was observed that about 41.3% of the legitimate emails did not have any links as opposed to about 4.3% for the phishing emails. This emphasizes that legitimate emails are commonly informational, generally meant to convey a message to the receiver. In contrast, phishing emails have the tendency to lure users into revealing personal information by invoking an action from the user's side. It was also noted that the size of the legitimate links context for the legitimate email database was 10 and the number of emails marked legitimate by this context was 304. It suggests that a legitimate mailbox tends to receive similar links. In other words, a mailbox owner has a certain range of interests that determines which links he or she is more likely to receive. For example, a person who is a member of an online retailer will be receiving many notifications and advertisements from the retailer with links having the same domain. Furthermore, the legitimate links context also reduces computations by taking advantage of this fact that a user tends to receive similar links frequently.

In one embodiment, PhishSnag was implemented using Perl v5.12.4 on a CORER 2 Duo 2.66 GHz processor, 4 GB RAM machine running 32 bit WINDOWS 7, but other implementations may be utilized.

Some of the challenges that may be faced during implementation are: The GOOGLE Search API would not allow frequent automated searches. As a result, Bing (a trademark of Microsoft Corporation) was implemented, which does not have this problem, as a backup search engine. If GOOGLE Search fails, then Bing search may be used. GOOGLE may be prioritized over Bing because GOOGLE's search engine is accepted as the norm and it may be easier to compare results to prior research that used GOOGLE. For IDF calculations, if the GOOGLE search approach is adopted, then the search information, together with the total number of web pages in GOOGLE's database, can be used to measure the IDF value for each word. However, GOOGLE may return only a somewhat loose upper bound on the number of web pages containing the word for efficiency purposes, which is progressively refined as the user examines the search results list. For this reason and the fact that GOOGLE discourages frequent automated searching, the email database itself was used to estimate the IDF value in evaluations. Parsing an email into the constituent header and body and then extracting the text and links from it was challenging since most emails are HTML encoded and the headers do not always end with the same line format.

PhishSnag has been tested on WINDOWS operating systems but may be adapted to other platforms. The method of extracting data from emails relies on the use of regular expressions. From analyzing thousands of emails, it was observed that the message headers were formatted differently among them. A large number of email formats were studied in order to design the decoder, which decodes html if present, extracts info from the header and body and removes any attachments. If an attachment is present in an email, then the last portion of the message header contains one of the following:

Content-Disposition: attachment Content-Disposition: inline

This is followed by the encoded attachment file. This information is used to ignore all attachments.

While the headerAnalysis( ) classifier alone shows very high coverage and high accuracy, the importance of link analysis stems from the fact that a sophisticated phisher can manipulate the originating "Received From", "From," and the "Delivered To" information completely. To this end, link analysis is very important and provides robustness to the embodied combination schemes. Results from linkAnalysis( ) have also shown that it is very difficult to create a fraudulent link to bypass this classifier. Unless the phishers have hacked into the mail server or the user's account, they would not have access to the context of the user's mailbox. Hence, it is likely that the link context information will also play a part in detecting such an email while reducing computational overhead.

When someone hacks into an account in the same domain and uses a friend list to attack any user in the same domain, the headerAnalysis( ) may fail to detect this. But even in such a case, PhishSnag can use the linkAnalysis( ) classifier to mark the email as phishing since the intent of the email is still to steal sensitive information by asking the user to click on a link for a malicious website. This even works for the scenario when user A's account is hacked and user A receives a phishing email. For example, if A's sensitive information is stored in an encrypted form. This scenario motivates the union of the two schemes as opposed to the intersection.

PhishSnag's schemes are highly efficient since they do not require any training, ignore the text in the email, and makes use of on-the-fly databases of links databases, which may reduce searching.

As DKIM becomes widely deployed, sending domains will develop reputations as sources of spam or useful messages. DKIM provides an authentication mechanism for the email domain that sent the email. It is thought that senders are not able to create covert sub-domains under their main domain (unless an authorized insider attacker is involved which may be unlikely) and cannot manipulate the "Received From" fields of legal intermediate MTAs. It is noted that it is not very easy to identify whether a "Received From" field is from a genuine intermediate MTA or just added by the phisher to confuse the header analysis. The highest probability for a "Received From" field of truly originating from a genuine intermediate MTA is the one closest to the recipient's domain, justifying the use of the closest MTA in the scheme.

Redirection issues are handled with domains in the linkAnalysis( ) classifier. There are cases when a domain is not present in the top 30 GOOGLE search results because it redirects to another website. This problem may be avoided by checking whether the redirected link belongs to the same search result set. If the redirected link is found in that set, then linkAnalysis( ) marks the redirecting domain as legitimate, otherwise it is marked as phishing.

Through inspection of headerAnalysis( ) it was observed that among the legitimate emails, about 21.3% had DKIM signatures and about 14.5% had SPF queries that passed. In contrast, for the phishing emails, there were no SPF queries that passed and no DKIM signatures.

On a database of 4550 phishing emails (using the same phishing corpus as other directly related schemes available), the percentage of emails that are marked by one embodiment, PhishSnag, as phishing by Union (Intersection) is over about 99% (93%) compared to the other available schemes, having a result as low as 80%. On 1000 legitimate emails, Union (Intersection) marked over about 94% (99.5%) of the emails as legitimate compared to about 99% for other schemes. However, the legitimate email databases are different in this case since the authors of the other schemes do not mention how they collected their legitimate emails. In this sense, coverage was able to be increased significantly by about 13% with the Intersection algorithm for the phishing emails while increasing accuracy by about 0.5% simultaneously. Furthermore, the header and link analysis classifiers are far more advanced than other schemes in the sense that it also deals with email forwarding issues and accounts for the differences in the headers based on whether the email is sent from a mobile device or relayed by multiple servers in the user's domain. The inventive header analysis goes beyond that of other schemes and examines DKIM (DomainKeys Identified Mail) signatures and SPF (Sender Policy Framework) fields when available.

There are other schemes available that focus on the detection of masqueraded web pages rather than on phishing emails. These schemes experimented with only 100 websites. Still, they have a much higher false positive rate for legitimate web pages and lower coverage of masqueraded sites. Some other experimenters apply machine learning techniques on a set of about 860 phishing emails, and about 6950 non-phishing emails, and are able to correctly identify about 92% of the phishing emails with about a 0.1% false positive rate. Some schemes propose a learning algorithm that accepts a set of ten known features (IP based URLs, age of domain names, number of links, etc.) and decides whether an email is legitimate or phish. Some algorithms are first trained over a training data set followed by the evaluation phase using a separate test data set. Using derived structural properties of emails in conjunction with a SVM (Support Vector Machine) learning algorithm, some were able to detect about 95% of phishing emails but did not explicitly state any false positive percentages. Finally, it is important to note that the above-mentioned machine learning approaches require a training corpus of emails whereas the inventive approach eliminates this training overhead. In other words, supervised learning as proposed by available schemes is based on a training data set, whereas the inventive approach is unsupervised learning and does not require any training data. Moreover, machine learning techniques used by these researchers are prone to the well-known model over-fitting problem.

The invention will be further clarified by a consideration of the following examples, which are intended to be purely exemplary.

EXAMPLE 1

Consider a phishing email in which the bad link, deeming the email phishing, appears in the top right-hand corner of the email and the email (among other things) directs the reader to "click the link above." The score of verb v.epsilon.SV being score $(v)=\{1+x(l+a)\}/2.\sup.L$. The parameter x=1, if the sentence containing v also contains either a word from SA.orgate.D and either a link or the word "url," "link," or "links" appears in the same sentence, otherwise, x=0. The parameter l=2, if the email has two or more links, l=1 if the email has one link, and l=0 if there are no links in the email. The parameter a=1 if there is a word from U or a mention of money in the sentence containing v, otherwise a=0. Money is included for illustrative purposes since phishers often lure targets by promising them a sum of money if they complete a survey or by stating that someone tried to withdraw a sum of money from the user's bank account recently, etc. The parameter L is the level of the verb, where level of a verb in SV is one more than the least number of hyponymy links followed to reach the verb from a synset in Synset (V).

The reason for weighting the link score of the email (1) and the urgency or incentive score (a) of the sentence with a directive to take action (x) with respect to a link is to reduce the false positives for emails that acknowledge some previous action of the user. For emails received by user A that are replies to emails sent by, and contain a link in either A's signature included in the reply, or in the signature of the sender of the reply. For example, when someone submits a proposal or report to a website, an automatic acknowledgment is sent by the website and it usually includes a link. There are several instances in which emails contain links in the signature fields. The reason for the exponential decay with L is the diversity of verbs and the proliferation of their different senses at greater distances from SV, which leads to an increase in the imprecision of word sense disambiguation. Even without this complexity, word sense disambiguation is a challenging problem due to the ambiguity inherent in natural languages. The Textscore of an email e is given by Textscore (e)=Max{score (v)|v.epsilon.e}.

Many different scoring functions may be utilized for verbs and for Textscore. For example, sum may be used instead of max. Phish-Sem: Semantic feature selection towards automatic phishing email detection.

Another embodiment of the text based classifier employs a semantic feature selection method based on the statistical t-test and WordNet, and shows its effectiveness on phishing email detection by designing classifiers based on the text in the email combining semantics and statistics.

The feature selection method is general and useful for other applications involving text-based analysis as well. Due to its use of semantics, it is also robust against adaptive attacks and avoids the problem of frequent retraining needed by machine learning based classifiers.

This embodiment uses the same phishing email database as used by the other classifiers mentioned above, and it also uses a database of non-phishing Enron emails (www.cs.cmu.edu/.about.enron) for analysis purposes. 70% of both phishing and non-phishing emails were randomly selected for statistical analysis, hereafter called the analysis sets, and the remaining 30% were used for testing purposes. A set of 4,000 non-phishing emails obtained from the "sent mails" section of the Enron email database was used as a different dataset to test these classifiers.

This embodiment uses the same phishing email database as used by the other classifiers, and it also uses two databases of non-phishing Enron emails (www.cs.cmu.edu/.about.enron) for analysis purposes.

Using the feature selection method, four variants of the classifier are designed by combining statistics and semantics using Wordneein various ways, and the results are compared to determine the best variant.

Classifier 1: Pattern Matching only—This is the most basic of the variants, and it relies only on simple pattern matching between words. Here two subclassifiers are designed, namely Action-detector and Nonsensical-detector.

Figure 8:
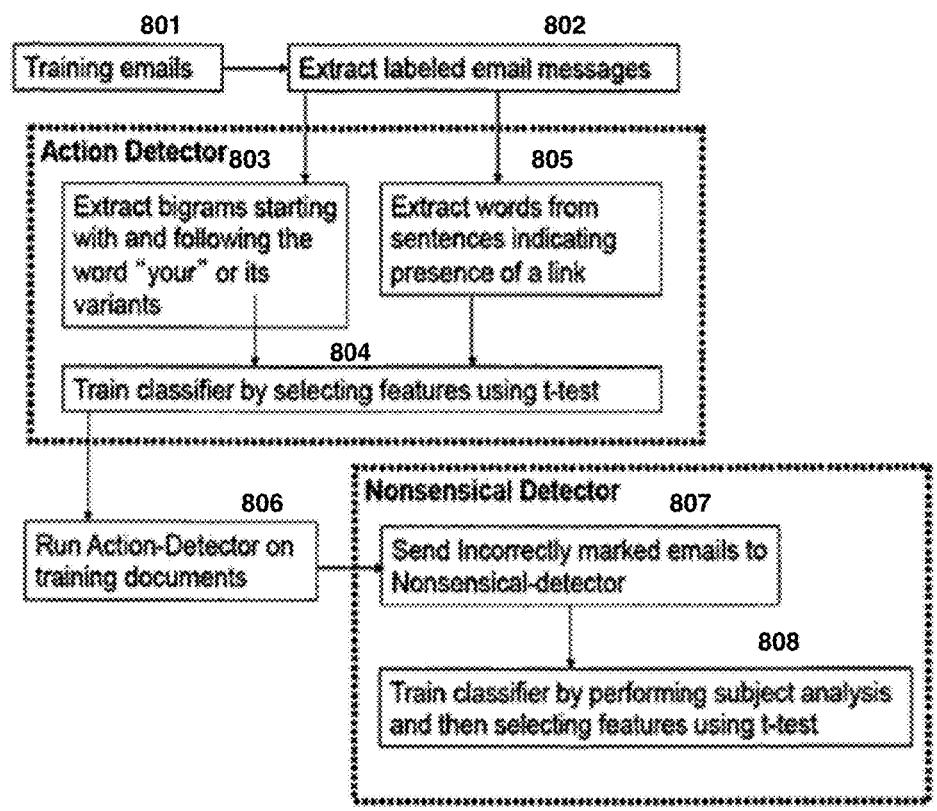
FIG. 8 is the flowchart for training algorithm of PhishSem embodiment.

As shown in FIG. 8, an action-detector builds on the idea that phishing emails tend to focus on secure or valuable properties owned by the recipient, and these emails claim that these properties have been compromised in some way. Upon the training emails are obtained 801, the labeled email messages are extracted 802. All the bigrams starting with and following the word "your" in the training set were obtained 803 and a two-tailed t-test was performed on each bigram to determine whether they qualified as candidate features 804. Note that instead of bigrams the general idea of N-grams, where N.gtoreq.1 is any whole number, can also be tried. For example, we tried unigrams and trigrams as well, but bigrams gave the best results Feature selection and justification: Based on a 2-tailed t-test and an alpha value of 0.01 (the probability of a Type I error), a bigram was chosen as a possible feature if the t-value for the bigram exceeded the critical value based on alpha and the degrees of freedom of the word. There are many possible weighting schemes for the bigrams. In one scheme, for example, the weight of each bigram b, denoted w(b), was calculated using the formula: W(b)=(P.sub.b−L.sub.b)/P.sub.b where P.sub.b=percentage of phishing emails that contain b L.sub.b=percentage of legitimate emails that contain b.

Features that had weights less than 0 were discarded as these features were significant for legitimate emails. The remaining features have weights in the interval [0,1], where features with higher weights allow better detection rate per phishing email encountered. For example, the denominator in the weight formula prioritizes a feature that is present in 20% phishing and 1% non-phishing emails over a feature that is present in 80% phishing and 61% legitimate emails.

Next, a frequency distribution of the selected bigrams was computed using their weights, and the bigrams that had weights greater than m-s, where m is the mean bigram weight, and s is the standard deviation of the distribution of bigram weights, were selected. The resulting set is called PROPERTY, as it lists the possible set of user's properties, which the phisher tends to declare as compromised.

The next task is to detect the pattern that calls for an action to restore security of the property. For this purpose, the text and links in the email were checked to determine whether there was a word that indicated the user to click on the links 805 (See FIG. 8). First, statistics of all the words in sentences having a hyperlink or any word from the set {url,link,website}, or s of these words such as plurals, capitalization, or created by hyphenation (e.g. web-site), or created by a space after web (e.g. web site), etc., was computed. Here the same feature selection method, as mentioned above for bigrams, was employed to choose the features. The resulting set of words is called ACTION, which represents the intent of the phisher to elicit an action from the user.

Design of the Action-detector subclassifier: For each email encountered, if the email has: the word "your", or its variants such as yours, your's, etc., followed by a bigram belonging to PROPERTY (e.g. "your paypal account"), and a word from ACTION in a sentence containing a hyperlink or any word from {url, link, website}, or variants of these words as mentioned in Paragraph, (e.g. "click the link"), the email is marked as phishing. Nonsensical-detector: If Action-detector is run and 806 fails to mark any email as phishing, control passes to the Nonsensical-detector 807. Many phishing emails escaped detection by Action-detector involved dumping words and links into the text, making the text totally irrelevant to the email's subject. The purpose of the Nonsensical-detector subclassifier is to detect emails where: the body text is not "similar" to the subject, and the email has at least one link. Thus, the nonsensical detector train classifier by performing subject analysis and then selecting features by t-tests 808.

An email body text is "similar" to its subject if all of the words in the subject (excluding stopwords) are present in the email's text.

In order to achieve this, first the stopwords were removed from the subject and the t-test was applied on the remaining words to select features from the subject. The goal is to filter words that imply an awareness, action or urgency, which are common in subjects of phishing emails. The resulting set was called PH-SUB. The Nonsensical-detector subclassifier is designed as follows: for each email encountered, if the email subject has at least: a named-entity, or a word from PH-SUB, then: if the email contains at least one link, and the email's text is "not similar" to the subject, the email is marked as phishing.

This detector requires a named-entity in the subject since the body of the email is completely tangential and irrelevant. Thus the phisher is relying on the subject of the email to scare the user into taking action with respect to some property of the user, which implies the presence of a named entity in the subject. Thus, it is assumed that in emails of this nature with irrelevant information in the body of the email, the named-entity in the subject is the property of the user under threat (e.g. "KeyBank", when the subject is: "Key-Bank security").

Classifier 2 (Pattern Matching+POS tagging): This classifier builds on Classifier 1, and part-of-speech tags for words are included in the t-test in an attempt to reduce the error in classification that occurs when simple pattern matching techniques are used. When the two bigrams: the first starting with the word "your" or its variants, and the second following the word "your" or its variants, are extracted, an additional check is performed to discard bigrams that do not contain a noun or a named-entity since the user's property, that the phisher tends to focus on, has to be a noun. When statistical analysis is performed on the words in sentences having a link, the words that are not marked as verbs are discarded since the feature here indicates the user to click on the link, and this word has to be a verb as it represents the action from the user's part. For the Nonsensical-detector, only named-entities, nouns, verbs, adverbs and adjectives are used when selecting features for PH-SUB. Furthermore, for the similarity check, only named-entities and nouns from the subject are selected, and their presence in the email's text are checked.

It is expected that the use of appropriate POS tags in Classifier 2 will bring an improvement in accuracy over Classifier 1. For instance, among the patterns "press the link below" and "here is the website of the printing press", the presence of the word "press" in the former is important, but Classifier 1 sees both the occurrences of "press" as belonging to ACTION.

Classifier 3: (PM+POS+Word Senses)—Here, Classifier 2 is extended by extracting the senses of words using Sense-Learner and taking advantage of these senses towards better classification. The goal is to reduce errors that result from ambiguity in the meaning of polysemous keywords. For instance, when "your account" appears, the classifier should be only interested in financial accounts and not in someone's account of an event. Toward this end, statistical analysis on words is performed taking account of their POS tags and senses, to train the classifier. Then this classifier is designed to look for patterns that match selected features up to their senses whenever the classifier analyzes an email.

Classifier 4: (PM+POS+Word Senses+WordNet)—So far the statistical analysis has selected a certain set of features biased to the analysis dataset. This is very similar to the way training works in machine learning based classifiers. A better way to extend the features and improve the robustness and generalization capability of the feature selection method is to find words closely associated with them so that similar patterns can be obtained. To this end, WordNetis incorporated in this classifier. Classifier 4 extends the sets PROPERTY, ACTION and PH-SUB into ext-PROPERTY, ext-ACTION and ext-PH-SUB respectively by computing first the synonyms and then direct hyponyms of all synonyms of each selected feature (with its POS tag and sense), expanding the corresponding sets. Note that because PROPERTY contains bigrams, only the nouns in these bigrams are extracted, their synonyms are added to ext-PH-SUB along with the direct hyponyms of all these synonyms. In addition, the classifier is modified as follows:

When searching for properties, a check is performed to determine whether the bigram that follows the word "your" includes a noun that belongs to ext-PROPERTY, instead of looking for the occurrence of the whole bigram in ext-PROPERTY.

In order to detect actions, each sentence that indicates the presence of a link is checked for the occurrence of a verb from ext-ACTION.

When performing the check for "similarity", for each noun in the email's subject, the email's text is scanned for the presence of a hyponym or a synonym of the noun.

The results in FIG. 9 show that each variant of Phish-Sem achieves at least 92% phishing email detection with less than 5% false positives. Furthermore, classifier 4 performs best in detecting phishing and non-phishing emails correctly, obtaining a phishing email detection of 95.02% and false positive of 2.24%.

EXAMPLE 2

Link Analysis

With search engines rate-limiting queries and charging for them, methods based on Web search may be relatively limited. The hypothesis is that obfuscation techniques used by phishers to fool people skew the character distributions in the phishing URLs. The features were built on this idea. More verification of this underlying hypothesis was done. Researchers in have used a bag of words representation of binary features to classify URLs. A hypothesis is made that there may be certain information not captured by this approach in the underlying character distributions. A collection of N-gram character frequencies is proposed to be used instead of a bag of words. The N represents the length of the character substring. Character N-Grams. Researchers have previously used normalized English single-letter frequencies in a URL as a collection of features for their phishing URL classier. Since this could be easy to evade, This idea is generalized by expanding to include the normalized character frequencies for all ASCII characters from ASCII code 33 to 122 excluding capital letters because the URLs is in lower case. The experiment has extended the N-grams extraction for N=1, N=2 . . . till N=10, i.e., for N=10. A substring from the URL is extract, which is 10 characters in length as our feature. When the notation is written N=2, the actually meaning is N≤2.

Pruning for batch machine learning. As the size of the N-grams extracted became larger, employ some pruning is employed to keep the feature space reasonable for batch machine learning algorithms. A certain percentage of the data set is taken, for example 1% of the URLs, and then all N-gram features that were present in less than that percentage of URLs were removed.

Online Learning Algorithms

Online machine learning method comprises Perceptron, Averaged Perceptron, Passive Aggressive, Passive-Aggressive I, Passive-Aggressive II, Confidence Weighted, or a combination thereof.

Phishing Dataset 1 is called DMOZ, which comprises 11275 random legitimateURLs from the DMOZ Open director Project paired with 11,271 human verified phishing URLs from PhishTank. The second set is called CSet2 comprising 14,920 phishing URLs provided from Huawei Digital's own phishing repository paired with 14,999 of the original author's legitimate URLs. Dataset 3 is called CSet3 comprising 18,395 phishing URLs acquired from Anti-phishing Working Group (APWG) combined with 19,999 less popular legitimate websites gathered using the original crawler. Besides, 125,000 phishing URLs from the Anti-Phishing Working Group was collected directly and paired with 125,000 randomly chosen URLs from the DMOZ, forming the largest individual dataset APWG100.

A positive occurrence here is defined as a phishing URL. In the context of our tests then a false positive is a benign URL that was falsely classified as phishing. False positive rate was included in the results because it has specific interest to the problem of phishing detection. When any software program is attempting to detect phishing attacks it is important that it has a very low false positive rate, because each false positive occurrence in a real system might mean an important message never reaches its recipient. Testing time. The time taken to evaluate the model on the set of 90,000 URLs took 2 seconds for the set of unigrams, 6 seconds for the set of bigrams, and to 30 seconds for the set of all trigrams. The increase in time seems to be reasonable, because even for the set of all trigrams, 3000 URLs still could be processed per second. This is more than fast enough to be built into a real-time system, such as a web browser.

An open source Online Learning Library from Google projects was used, for the algorithms: Perceptron, Averaged Perceptron, Passive Aggressive, Passive-Aggressive I and Passive-Aggressive II and Confidence Weighted. The Adaptive Regularization of Weights is used for online learning algorithm. The accuracy of the classifiers was presented as an intuitively understandable metric. In data classification applications, accuracy is given as the number of correct classifications out of the total number of test cases. With the usual notations, TP for True Positives, FP for False Positives, FN for False Negatives and TN for True Negatives, the accuracy is defined as:

$$Accuracy=(TP+TN)/(TP+FN+FP+TN)$$

Figure 10:
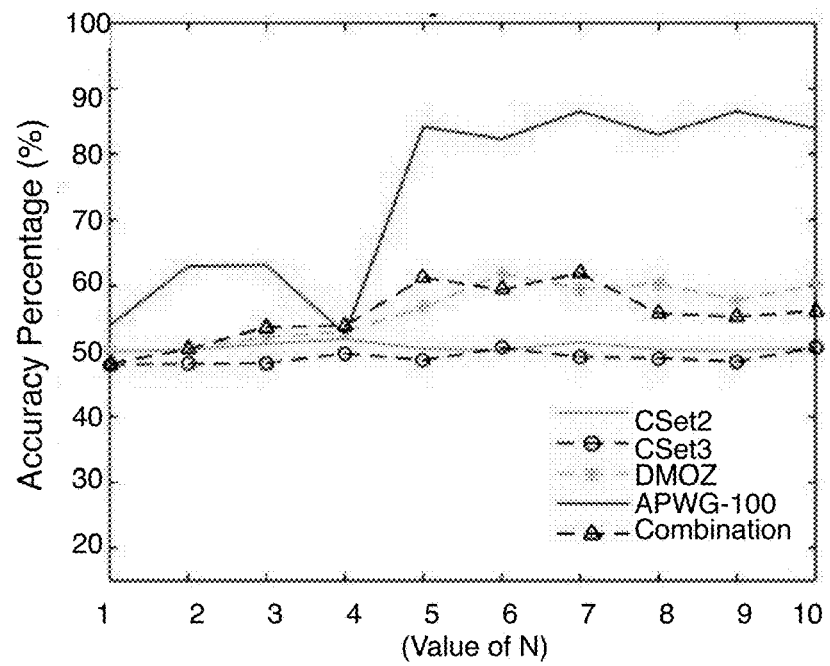
FIG. 10 shows the performance results for classifier of Perceptron for classifying data sets of links used for link analysis of an email.

The accuracies for the five online learning algorithms on the five datasets (DMOZ, CSet2, CSet3, APWG-100 and combined set) are reported. FIG. 1 shows the accuracies of the Perceptron Algorithm (P) for classifying URLs using character N-grams with values of N ranging from 1 through 10. The lower accuracies seen in FIG. 10 suggest that the Perceptron algorithm is a weak learner. The algorithm learns a great classier on the URLs of a specific class as they appear sequentially, but makes a wrong update as soon as it encounters one form a different class. Scanning the datasets used in this work, the fact that most of them follow a specific pattern, where a set of URLs belonging to the legitimate class is followed by a set of phishing URLs, is observed. This specific sequence of URLs degrades the power of an online learning classifier, which tends to overfit on the data as it encounters examples of the same type and updates sluggishly.

Figure 11:
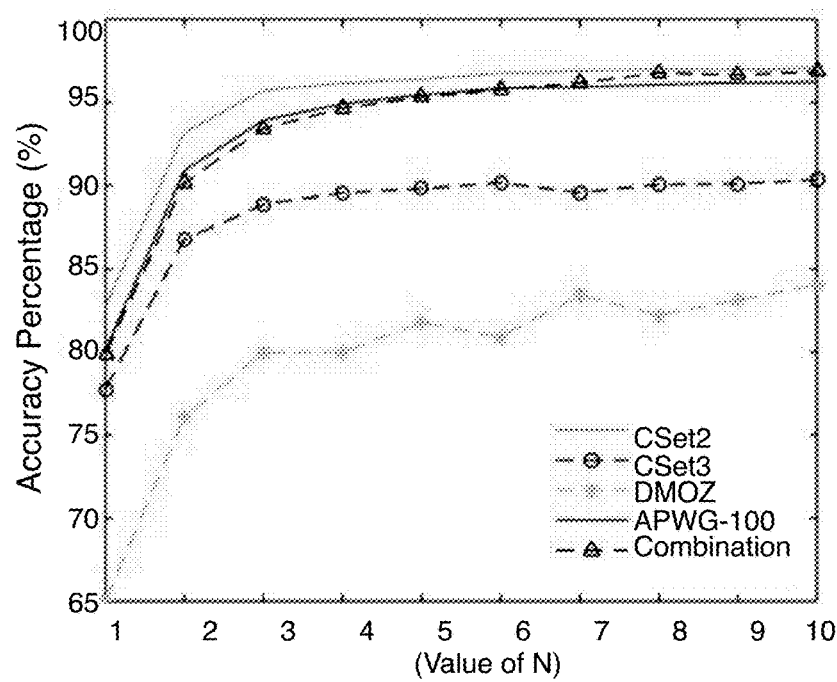
FIG. 11 shows the performance results for classifier of Averaged Perceptron for classifying data sets of links used for link analysis of an email.

Therefore, when the class changes in the data, the 'lazy' classier fails to update instantaneously and thereby misclassies the URLs. Thus this sluggish nature of online learning algorithms such as Perceptron and Passive-Aggressive leads to the aberrant classification graphs in FIGS. 10 and 12. The Perceptron algorithm thus depends on the order of the training data examples that it is trained on FIG. 11 shows the accuracies of the Averaged Perceptron Algorithm (AP) on the five datasets for the same set of feature values. The Averaged Perceptron is an improvement on the Perceptron algorithm's performance. As the algorithm iterates on all the data instances, it maintains a running sum of the averaged weight vector as it updates based on each instance encountered, along with keeping an account of the counts each weight vector survives after an update. The classier is updated accordingly and takes all the data into account without blindly depending on their order of appearance. The various plots of accuracies are similar, and the accuracies are between 82.5% to 97.5% (N>5) for all the datasets with the best accuracies on Cset2, Combinedset and APWG100 Datasets.

Figure 12:
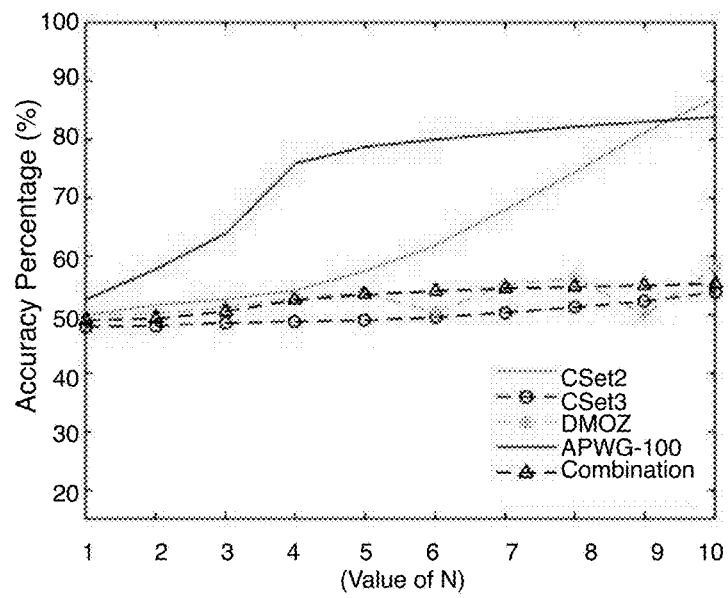
FIG. 12 shows the performance results for classifier of Passive Aggressive for classifying data sets of links used for link analysis of an email.

FIG. 12 shows the accuracies of the Passive-Aggressive Algorithm (PA) on the five datasets. Relatively worse performance of the Passive-Aggressive algorithm on the data was observed. The nature of the PA algorithm is that it is a passive learner when the weight vector correctly classifies a data instance and learns aggressively when it classifies incorrectly. An update, which is biased towards incorrectly classified instances only, gives an aberrant curve for datasets not shuffled well.

Passive-Aggressive I and II algorithms were also applied on the set of features, but the accuracy were similar with a change of approximately 0.001% from the Passive-Aggressive Algorithm.

Figure 13:
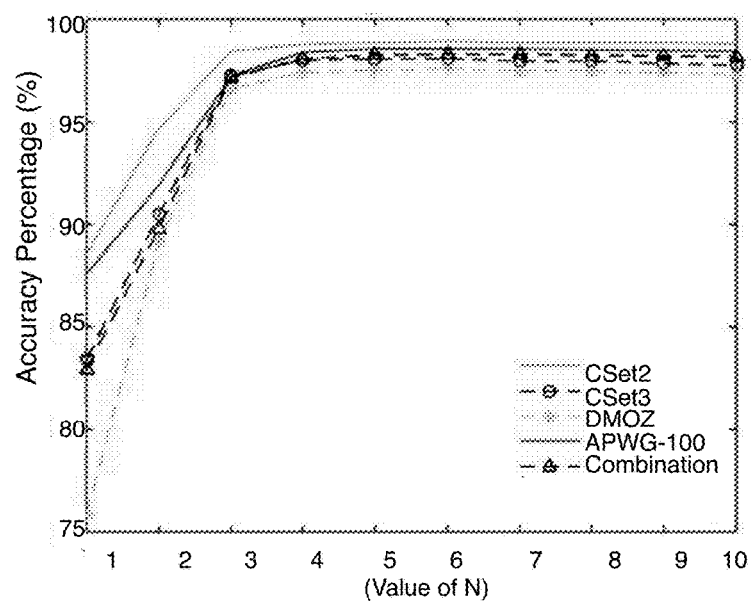
FIG. 13 shows the performance results for classifier of Confidence Weighted Algorithm (CW) for classifying data sets of links used for link analysis of an email.

FIG. 13 reports accuracies for the five individual datasets using the Confidence Weighted Algorithm (CW). Our N-Gram features performed very well yielding accuracies of 92-98% (for N>2) on the datasets. The extra cost of this performance increase is the higher dimensionality of the feature space. The Confidence Weighted algorithm takes the Gaussian distribution of the weight vectors: their mean and covariance into account while updating. A weight vector updated depending on a confidence parameter, more confident are updated more frequently and vice-versa. But the aggressive learning habit of the algorithm leads to overfit on the data and therefore it is vulnerable to label noise.

Figure 14:
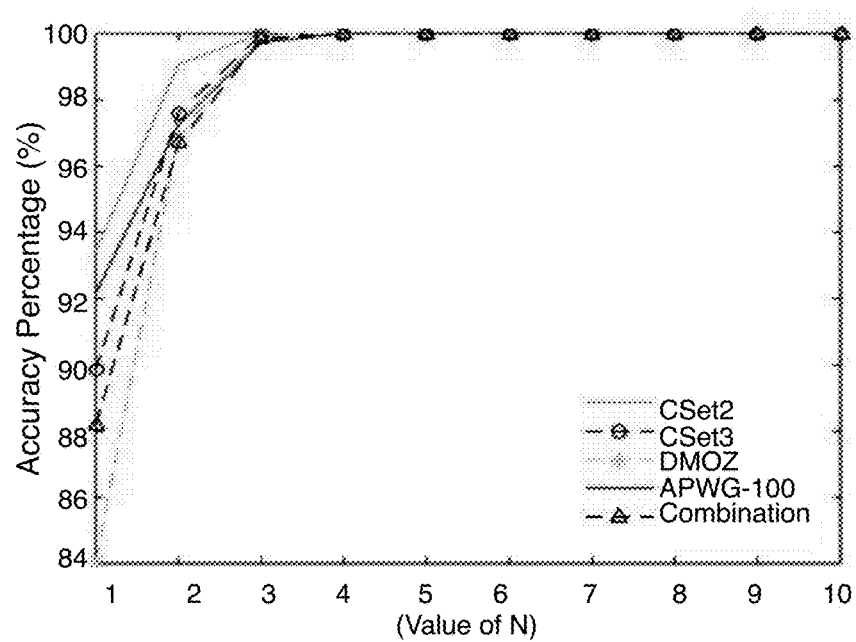
FIG. 14 shows the performance results for classifier of Adaptive Regularization of Weights (AROW) for classifying data sets of links used for link analysis of an email.

FIG. 14 shows the accuracies of the Adaptive Regularization of Weights (AROW) on the four datasets. Exceptionally great results with the AROW algorithm achieving 100% accuracy for all higher values of N were reported.

Figure 15:
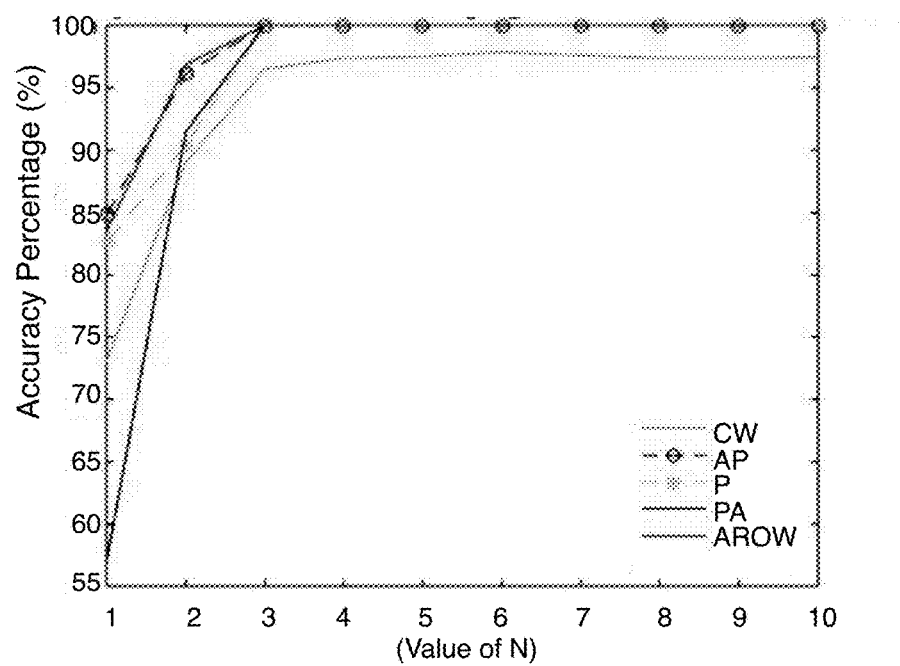
FIG. 15 shows the performance results of online learning algorithms for classifying shuffled data sets of links used for link analysis of an email.

FIG. 15 depicts the accuracy percentages of how the online learning algorithms perform for N values from 1 to 10 using N-gram classifer. The high accuracies were obtained using algorithms of Perceptron and Passive-Aggressive, which. Had poor performance in unshuffled dataset. The results indicate that shuffling can enhance the performance of even simple online learning algorithms that are order dependent. However, in a real-time deployment scenario, there is no control over the order in which the data items arrive. Therefore, the AROW that is relatively insensitive to the data presentation order is more appropriate for practical deployment.

Training Time and Testing Time

Table 1 shows the results of the training time (time that takes for the algorithm to build the model) for the online algorithms and the testing time (time that takes for the algorithms to test the model on the dataset. All the training times and testing times are obtained using 10-gram features extracted from the APWG100 Dataset. The number of distinct features presented in the dataset is 27,601,162.

TABLE 1

The training times and testing times for online algorithms on 10-grams

| Online Algorithm | Training Time (s) | Testing Time (s) |
|---|---|---|
| P | 232.66 | 61.61 |
| AP | 232.66 | 64.6 |
| PA | 222.22 | 60.72 |
| CW | 449.59 | 61.21 |
| AROW | 1265.07 | 21.44 |

Generalization

Generalization is a typical problem in machine learning systems. Thus, the ability of the classifiers to cope with unseen data is tested. The best online learner, AROW is applied in this test. The classifier is trained on one of the phishing datasets, and then the model is evaluated on the datasets that are different from the training datasets. The cross dataset validation on the phishing datasets is performed using the AROW Algorithm and bigrams as features. The results are presented in Table 2.

TABLE 2

Cross-dataset accuracies for phishing datasets with AROW

| Training Set | Testing set | | | | |
|---|---|---|---|---|---|
| | DMOZ | CSet2 | CSet3 | APWG100 | Comb |
| DMOZ | 96.76% | 92.45% | 89.54% | 89.91% | 94.44% |
| CSet2 | 85.45% | 99.11% | 90.72% | 89.72% | 92.48% |
| CSet3 | 87.53% | 95.82% | 97.67% | 91.80% | 94.44% |
| APWG100 | 87.53% | 92.69% | 88.52% | 87.53% | 88.92% |
| Comb | 94.70% | 98.10% | 96.67% | 92.74% | 96.69% |

Further character N-gram (C-N) is compared with word bagging (W-B). Table 3 shows the comparisons of accuracies between character N-gram analysis techniques using 6-grams as the feature values and word bagging techniques.

TABLE 3

Accuracies comparison on four phishing datasets using two feature extraction techniques

| Dataset | CW-W-B | CW-C-N | AROW-C-N |
|---|---|---|---|
| DMOZ | 94.40% | 97.41% | 100% |
| CSet2 | 98.05% | 98.86% | 100% |
| CSet3 | 96.10% | 97.85% | 100% |
| APWG100 | 97.44% | 98.48% | 99.998% |

EXAMPLE 3

Header Analysis of Emails

Header Domains

The header fields concerned with the transfer and delivery of the emails mostly contain the name of the domain of each mail client and server that it passes through. For example in the 'From' field address a@sender.com, 'sender.com' is the domain name. These domains are extracted from all the fields which contain such information and are collectively addressed as 'Header domains' in the paper.

Message-ID

RFC 2822 states that each email must have a globally unique identifier called Message-ID. If this is included it must be in the email header. RFC 2822 also defines the syntax of Message-ID. It should be like a legitimate email address and it must be included within a pair of angle brackets. A typical Message-ID looks like the following: <20020923025816.8E7A34A8@mercea.net>. According to RFC 2822, Message-ID can appear in three header fields. They are Message-ID header, in-reply-to header and references header. But Message-ID of the present email must be included against the Message-ID header. It has a fixed format of the form <LHS@RHS> where the left hand side (LHS) is a representation of information including current time stamp, queue id, etc. coded in different formats according to the Sendmail version. The right hand side (RHS) represents the fully qualified domain name (FQDN). This part starts with local host name followed by a dot and other parts of domain information.

N-Gram

The term N-gram is related to natural language processing. It is a sequence of n characters or words in a string or text. An example of character n-gram from the text 'office365' would be like these: the 1-grams would consist of one character sequence e.g. o, f, 6, etc. Similarly, 2-grams would be overlapping sequence of 2 characters like of, ff, fi, e3, 65 etc. Higher order n-grams can be derived in a similar manner by applying this idea further.

Components of the System

The system comprises a domain extraction component, a path analysis component, a data file creation component, N-gram analysis component, and classification component. The domain extraction component is responsible for extracting the domains from the email headers, which is a string of header fields that contain information about an email's path.

The path analysis component extracts the information about the path that an email has taken from the sender to the recipient from the header. Four checks were performed in the path analysis. The first one is called from received-from mismatch referring to checking whether the From filed domain matches the domain of the first Received-From field. The second one is called all by in received-from referring to all "by" domain from the header must also be in the Received-From domain. The third one is called Claiming Domain Different from Actual Domain, which refers to phishing emails that claims to be from a domain but actually belongs to another. The fourth one is called Path Broken, which refers to checking whether the Received-From domain matches the previous By domain at all the connected edges of the delivery path.

The data file creation component of the system creates the data file after the domain extraction is done. N-gram analysis component conduct N-gram analysis on the header domains data, which is non-numerical in nature.

The classification component runs seven classifiers on an aff file containing the extracted data. The seven classifiers comprises RandomForest, J48, Bagging, Attribute Selected Classifier, SMO, Bayesian Logistic Regression and Naive-Bayes Multinomial.

Random Forest classifier comprises of several decision tree classifiers. Each tree has a random set of features out of the total feature collection and this algorithm returns the maximum frequency class among all of the individual decision trees. It performed the best quite consistently in the experiments. For the experiments the default implementation of Weka 3.6 was used for the Random Forest classifier.

J 48 is a Java implementeation of the decision tree formed by classifier C4.5.

SMO is an implementation of sequential minimal optimization algorithm devised by John Platt for training a support vector classifier. All attributes are normalized by default in this algorithm.

Bootstrap Aggregating or Bagging is a method for generating multiple versions of a predictor and using these to get an aggregated predictor. The aggregation averages over the versions when predicting a numerical outcome and does a plurality vote when predicting a class.

Attribute selected classifier first does attribute selection and reduces the dimensionality of the training and testing sets before running the classifier. It is useful in removing redundant attributes and thus improving classification.

Bayesian Logistic Regression is an implementation of bayesian logistic regression for both Gaussian and Laplace priors.

Naive Bayes Multinomial classifier builds and uses a multinomial naive bayes classifier.

Apart from Weka, an online confidence weighted algorithm was used for classification. This online algorithm provides faster detection than Weka. Thus, higher order n-gram files can be classified using this online algorithm than Weka. Compared to batch algorithms, the online algorithms have the capability to learn from each instance and then discard it immediately without the need of storing the whole set of instances.

Experiment on SMTP Servers

The main goal for this experiment is to determine whether the SMTP servers of domains in the phishing emails are more likely to be open than those of the legitimate emails. This information provides substantial proof to support that phishers using source routing. There are six states returned by nmap for SMTP server including Open, Closed, Filtered, Unfiltered, Open-filtered and Closed-filtered. In the state of Open, UDP datagrams or SCTP associations on this port. Finding these is often the primary goal of port scanning. Security-minded people know that each open port is an avenue for attack. Attackers and pen-testers want to exploit the open ports, while administrators try to close or protect them with firewalls without thwarting legitimate users. Open ports are also interesting for nonsecurity scans because they show services available for use on the network.

In the state of Closed, a closed port is accessible (it receives and responds to Nmap probe packets), but there is no application listening on it. They can be helpful in showing that a host is up on an IP address (host discovery, or ping scanning), and as part of OS detection. Because closed ports are reachable, it may be worth scanning later in case some open up. Administrators may want to consider blocking such ports with a firewall. Then they would appear in the filtered state, discussed next.

In the state of Filtered, the Nmap cannot determine whether the port is open because packet filtering prevents its probes from reaching the port. The filtering could be from a dedicated firewall device, router rules, or host-based firewall software. These ports frustrate attackers because they provide so little information. Sometimes they respond with ICMP error messages such as type 3 code 13 (destination unreachable: communication administratively prohibited), but filters that simply drop probes without responding are far more common. This forces Nmap to retry several times just in case the probe was dropped due to network congestion rather than filtering. This slows down the scan dramatically.

In the state of Unfiltered, a port is accessible, but Nmap is unable to determine whether it is open or closed. Only the ACK scan, which is used to map firewall rulesets, classifies ports into this state. Scanning unfiltered ports with other scan types such as Window scan, SYN scan, or FIN scan, may help resolve whether the port is open.

In the state of Open-filtered, Nmap places ports in this state when it is unable to determine whether a port is open or filtered. This occurs for scan types in which open ports give no response. The lack of response could also mean that a packet filter dropped the probe or any response it elicited. So Nmap does not know for sure whether the port is open or being filtered. The UDP, IP protocol, FIN, NULL, and Xmas scans classify ports this way.

In the state of Closed-filtered, Nmap is unable to determine whether a port is closed or filtered. It is only used for the IP ID idle scan.

There are also three options for SMTP state. In the first SMTP state, granular state information is kept for each SMTP server returned for the Received-From domain in the header. The name of the serve and its corresponding state are combined. N-grams are obtained from this combination and used as features.

The second option for SMTP state is the strict open assumption. Here, the aggregation of the states of all the SMTP servers is returned by each of the Received-From domains. The states are converted to binary form by assigning the state 1 to only those SMTO servers, which returned "Open" state. All other 5 states are assigned 0. If any of the SMTP servers had open state −1, the corresponding domain was considered to have open state −1. Again the domains were combined with the aggregated states and n-gram features were derived from them.

The third option for SMTP state is the strict closed assumption. The same as 2 except here the states were converted to binary form by assigning the state 0 to only those SMTP servers returned as "Closed" state and all other 5 states are assigned 1.

An algorithm is built to extract all character n-grams from the header domains and represent them as unique features in the form of Unicode point of the characters. For example, the Unicode code point for "a" is 97 so the 1-gram "a" will be represented as 97. The feature extracted is the frequency of the n-game in the attribute LHS or RHS. In the Experiment, the step of extracting domain from IP was added. The datasets are divided into training, validation and testing sets for each classifier. The 10-fold cross validation test option is selected for maintaining uniformity. After training on the training set and adjusting the values for number of iterations and regularization parameters using the validation set, the model is saved and then used it on the testing set. About 60%, 10% and 30% is chosen as the sizes of the training, validation and testing sets respectively. With these online algorithms, up to 10-grams for all the files were performed. Looking at both the TPR and FPR values of these experiments, it was revealed that with an increase in order of n-gram, the classification but it starts deteriorating after a certain n-gram value. For most of the experiments this optimum value was obtained at the threshold of around (VALUES) grams. The results for various sets of experiments are presented in Table 4.

Feature Selection

N-gram analysis generates a high number of features. Therefore, the most contributing features towards the final classification have to be identified. Table 5 and 6 show the selected top 25 features with their respective information gain values, which indicates that the domain with uh.edu in them were easily separable from others since a large number of emails of the contributor having this particular domain segment.

TABLE 5

Information Gain values for 5 gram
FullDomainsBalNazarioPhishNewRVL
5-gram
FullDomainsBalNzazarioPhishNewRVL

| No. | Information Gain | Feature |
|---|---|---|
| 1 | 0.985588 | o |
| 2 | 0.98479 | m |
| 3 | 0.98304 | space |
| 4 | 0.98304 | "space |
| 5 | 0.9811 | or |
| 6 | 0.975533 | u |
| 7 | 0.973901 | edu |
| 8 | 0.973901 | .ed |
| 9 | 0.973901 | du |
| 10 | 0.973901 | .e |
| 11 | 0.973901 | .edu |
| 12 | 0.969608 | h. |
| 13 | 0.969608 | uh |
| 14 | 0.969608 | h.e |
| 15 | 0.969608 | uh.e |
| 16 | 0.969608 | uh.ed |
| 17 | 0.969608 | h.ed |
| 18 | 0.969608 | h.edu |
| 19 | 0.969608 | uh. |
| 20 | 0.968558 | s. |
| 21 | 0.967529 | ail |
| 22 | 0.967529 | mai |
| 23 | 0.967529 | mail |
| 24 | 0.967529 | il |
| 25 | 0.967529 | ai |

TABLE 4

The Results of the Accuracy for Phishing Detection Classifiers
1-gram Full Domains CSDMC 2010 NazarioPhishNew

| Class | Classifier | TPRate | FPRate | Fscore | Accuracy |
|---|---|---|---|---|---|
| Legitimate | Bayesian Logistic | 100 | 0.1 | 99.9 | 99.9369 |
| Phishing | Regression | 99.9 | 0 | 99.9 | |
| Legitimate | Naïve Bayes | 100 | 2 | 98.9 | 98.9276 |
| Phishing | | 98 | 0 | 99 | |
| Legitimate | SMO | 100 | 0 | 100 | 99.9842 |
| Phishing | | 100 | 0 | 100 | |
| Legitimate | AdaboostM1 | 99.7 | 0.1 | 99.8 | 99.7949 |
| Phishing | | 99.9 | 0.3 | 99.8 | |
| Legitimate | AttributeSelectedClassifier | 100 | 0.5 | 99.7 | 99.7476 |
| Phishing | | 99.5 | 0 | 99.8 | |
| Legitimate | Bagging | 100 | 0.1 | 99.9 | 99.9211 |
| Phishing | | 99.9 | 0 | 99.9 | |
| Legitimate | J48 | 100 | 0.2 | 99.9 | 99.8896 |
| Phishing | | 99.8 | 0 | 99.9 | |
| Legitimate | RandomForest | 100 | 0 | 100 | 99.9842 |
| Phishing | | 100 | 0 | 100 | |

TABLE 6

Information Gain values for 5 gram
FullDomainsBalNazarioPhishNewRVL
5-gram
FullDomainsBalNzazarioPhishNewRVL

| No. | Information Gain | Feature |
|-----|------------------|---------|
| 1   | 0.977489         | e       |
| 2   | 0.977009         | m       |
| 3   | 0.973901         | uh      |
| 4   | 0.973352         | c       |
| 5   | 0.972813         | cs      |
| 6   | 0.972813         | cs      |
| 7   | 0.972813         | .u      |
| 8   | 0.972813         | .uh     |
| 9   | 0.972813         | s.      |
| 10  | 0.972266         | o       |
| 11  | 0.969608         | cs.uh   |
| 12  | 0.969608         | s.u     |
| 13  | 0.969608         | s.uh    |
| 14  | 0.969608         | cs.u    |
| 15  | 0.96831          | s       |
| 16  | 0.967529         | il      |
| 17  | 0.967529         | ail     |
| 18  | 0.967529         | ai      |
| 19  | 0.967529         | mail    |
| 20  | 0.967529         | mai     |
| 21  | 0.966257         | ma      |
| 22  | 0.965111         | u       |
| 23  | 0.963732         | l       |
| 24  | 0.963428         | .cs.    |
| 25  | 0.963428         | .cs     |

Comparative Analysis

A direct comparison was made with Phish-IDetector, a system which uses nagram analysis on Message-IDs of the emails. Header domains excluding the Message-ID header, and only Message-ID header were extracted for the header domain analysis separately. The results from experiments on the Message-IDs and the rest of the header domains reveal that header domain analysis produces better detection and greatly reduces the false positive rate. Therefore, header domain are a better indicator of legitimacy of emails than just the Message-ID.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A computer-implemented method for detecting phishing attacks consisting of:
   receiving an email containing at least one link from a user's mail transfer agent;
   performing, prior to the email arriving at a mail user agent, the steps of:
      separating said email into a link part, a header part and a body part;
      extracting information from said header part, said link part and said body part of the email;
      conducting, text analysis on the body part of the email by applying natural language processing techniques thereto;
      conducting header analysis on the header part of the email and link analysis on the link part of the email by applying unsupervised machine learning classifiers individually or in combination thereto, wherein said header analysis comprises:
         tracing a path of delivery of said email using a header domain extracted from the header part;
         analyzing a string of domain names in the header domain using Character N-gram analysis;
         applying the machine learning classifiers based on the analyzing step;
         and determining the email is phishing based on the machine learning classifiers;
      and classifying the email based on results of said text analysis, said header analysis and said link analysis.

2. The computer-implemented method of claim 1, wherein a header domain and subject information is extracted from the header part of the email.

3. The computer-implemented method of claim 1, wherein said natural language processing techniques comprise syntax analysis, statistical analysis, or semantics analysis or a combination thereof.

4. The computer-implemented method of claim 1, wherein the text analysis is enhanced by feature selection techniques.

5. The computer-implemented method of claim 4, wherein said feature selection techniques comprise the steps of grouping candidate features from text of said email and selecting the combination of features used in phishing email detection, said candidate features comprising words from the body part, subject information from the header part, the parts-of-speech tags of the words, the sense of each word or a combination thereof.

6. The computer-implemented method of claim 5, wherein the candidate features are grouped based on a technique comprising pattern matching, or statistical analysis of said candidate features.

7. The computer-implemented method of claim 6, wherein said pattern matching comprises syntactic analysis, statistical analysis, or semantic analysis or a combination thereof.

8. The computer-implemented method of claim 7, wherein said pattern matching is configured to select a combination of features used for detecting a phishing email.

9. The computer-implemented method of claim 5, wherein said parts-of-speech tags comprise:
   tagging the body part of said email based on a part of speech;
   determining said email as an action-seeking email or a descriptive email; and
   refining selected candidate features.

10. The computer-implemented method of claim 5, wherein said sense of each word technique comprises:
    tagging the body part of said email based on a contextual sense of each word using natural language processing techniques;
    determining said email as an action-seeking email or a descriptive email; and
    refining selected candidate features.

11. The computer-implemented method of claim 5, wherein a lexical database for the words from the body part of the email is incorporated to expand the set of selected features to further enhance phishing email detection.

12. The computer-implemented method of claim 5, wherein a lexical database for a language of the body part of the email is configured to determine said email as an action-seeking email or a descriptive email.

13. The computer-implemented method of claim 1, wherein said machine learning classifiers comprise Random Forest classifier, J48 decision tree, Sequential Minimal Optimization algorithm, Bootstrap Aggregating, Attribute Selected Classifier, Bayesian Logistic Regression classifier, or Naive Bayes Multinomial classifier, or a combination thereof.

14. The computer-implemented method of claim 1, wherein said link analysis comprises web searching, a batch machine learning method, or an online machine learning method, or a combination thereof.

15. The computer-implemented method of claim 14, wherein said web searching comprises searching information extracted from the body part and the link part of said email through the Internet or searching a public phishing blacklist.

16. The computer-implemented method of claim 14, wherein said batch machine learning method comprises developing an email classifier based on information extracted from the link part.

17. The computer-implemented method of claim 14, wherein said online machine learning method comprises Perceptron, Averaged Perceptron, Passive Aggressive, Passive-Aggressive I, Passive-Aggressive II, Confidence Weighted, or Adaptive Regularization of Weights, or a combination thereof.

18. The computer-implemented method of claim 16, wherein said email classifier is developed based on a class of features of Character N-grams.

19. The computer-implemented method of claim 1, further comprising developing a context history database containing the extracted information and phishing and/or non-phishing label for each received email configured to determining a new email as a phishing email or non phishing email based on similarity between said new email and information in said context history database.

* * * * *